United States Patent
Katsuno et al.

(10) Patent No.: US 7,085,577 B1
(45) Date of Patent: Aug. 1, 2006

(54) MOBILE COMMUNICATION SYSTEM AND METHOD

(75) Inventors: Yasuharu Katsuno, Chigasaki (JP); Ryohji Honda, Matsubushi-machi (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,174

(22) Filed: Feb. 8, 2000

(30) Foreign Application Priority Data

Mar. 10, 1999 (JP) ................................. 11-063844

(51) Int. Cl.
*H04Q 7/20* (2006.01)
(52) U.S. Cl. ........................... 455/456.3; 455/414.1; 455/41.1
(58) Field of Classification Search .. 455/456.1–456.6, 455/432.1–432.3, 433, 436, 438, 440–441, 455/445, 561, 517, 412.1–412.2, 413, 414.1, 455/417, 551, 186.1, 41.1–41.3, 426.1, 454, 455/457; 709/206
See application file for complete search history.

(56) References Cited

U.S. PATENT DOCUMENTS

| | | | | |
|---|---|---|---|---|
| 5,625,668 A * | 4/1997 | Loomis et al. | ........... | 455/456.5 |
| 5,818,920 A * | 10/1998 | Rignell et al. | ........... | 455/433 |
| 6,075,992 A * | 6/2000 | Moon et al. | ........... | 455/455 |
| 6,097,945 A * | 8/2000 | Evensen et al. | ........... | 455/445 |
| 6,115,611 A * | 9/2000 | Kimoto et al. | ........... | 455/456.3 |
| 6,292,743 B1 * | 9/2001 | Pu et al. | ........... | 455/456.6 |
| 6,477,353 B1 * | 11/2002 | Honda et al. | ........... | 455/11.1 |
| 6,728,545 B1 * | 4/2004 | Belcea | ........... | 455/456.2 |
| 2001/0039181 A1 * | 11/2001 | Spratt | ........... | 455/11.1 |
| 2005/0135319 A1 * | 6/2005 | Shi et al. | ........... | 370/338 |

FOREIGN PATENT DOCUMENTS

| | | |
|---|---|---|
| EP | 0 700 226 A2 | 8/1995 |
| JP | 63-300637 | 12/1988 |
| JP | 04-090630 | 3/1992 |
| JP | 4-90630 | 3/1992 |
| JP | 05-175 900 | 7/1993 |
| JP | 5-175900 | 7/1993 |
| JP | 07-240952 | 9/1995 |
| JP | 7-240952 | 9/1995 |
| JP | 08-12602 | 5/1996 |
| JP | 8-126062 | 5/1996 |
| JP | 10-049798 | 2/1998 |
| JP | 10-190809 | 7/1998 |
| JP | 10-304457 | 11/1998 |
| JP | 11-017610 | 1/1999 |

(Continued)

*Primary Examiner*—Eliseo Ramos-Feliciano
(74) *Attorney, Agent, or Firm*—L. Herzberg

(57) ABSTRACT

A mobile communication system for designating a specific location and for selecting a call destination is provided. A server stores and manages the locational information (latitude and longitude) for the individual mobile stations. When each of the mobile stations transmits, to the server, mail including the designation of the locational range for a communication partner and other information to be provided, the server uses the locational information of the mobile stations and the range included in the mail (latitude and longitude at the center, and radius) to determine whether the location of a pertinent mobile station falls within the designated range, and thus obtains the user names of all the mobile stations present in the range. When there are too many mobile stations in the range, the server reduces the number of mobile stations and selects mobile stations based on user attributes. The server then transmits, to the thus selected mobile stations, mail including the information to be provided.

15 Claims, 19 Drawing Sheets

FOREIGN PATENT DOCUMENTS

| | | |
|---|---|---|
| JP | 11-41639 | 2/1999 |
| JP | 11-041639 | 2/1999 |
| WO | WO 97/41654 | 4/1997 |
| WO | WO 97/41654 | 11/1997 |

* cited by examiner

| User name | Locational information ||
|---|---|---|
| | Lat. N. | Long. E. |
| 09012345678 | 35° 18' 05" | 139° 15' 57" |
| 09023456789 | 35° 15' 55" | 139° 08' 44" |
| 09034567890 | 35° 19' 58" | 139° 09' 35" |
| ⋮ | ⋮ | ⋮ |
| 09045678901 | 36° 32' 10" | 139° 03' 35" |
| ⋮ | ⋮ | ⋮ |

| User name | Personal information |
|---|---|
| 09012345678 | A, B, C |
| 09023456789 | C, D |
| 09034567890 | A, B |
| ⋮ | ⋮ |
| 09045678901 | B, D |
| ⋮ | ⋮ |

Fig. 6

| User name | Message ID | Category | Effective time | Designation method | Effective range (lat. N., long. E., distance (m)) | Maximum recipients | Contents |
|---|---|---|---|---|---|---|---|
| 09012345678 | 1000 | A, B | 08221700 | 1 (absolute) | (36°00'01", 139°16'21", 2064) | 10 | --- |
| 09045678901 | 2000 | C | 08230900 | 2 (relative) | (09056789012, 1024) | 10 | --- |
| ⋮ | ⋮ | ⋮ | ⋮ | ⋮ | ⋮ | ⋮ | ⋮ |
| 09023456789 | 1024 | D | 08222200 | 1 (absolute) | (35°42'51", 140°19'06", 100) | 20 | --- |
| ⋮ | ⋮ | ⋮ | ⋮ | ⋮ | ⋮ | ⋮ | ⋮ |

Fig. 7

MOBILE COMMUNICATION SYSTEM AND METHOD

FIELD OF THE INVENTION

The present invention relates to a mobile communication system and a method for calling, at a designated time, a portable telephone terminal or a PHS terminal located in a specific communication area for providing information concerning such a terminal.

BACKGROUND ART

Portable telephones and PHS terminals, which have become very popular devices, are widely used today.

Paralleling the employment of such devices, practical use is being made of a service whereby the location of a mobile terminal, such as a portable telephone or a PHS terminal, can be derived from information acquired for a base station communication area where the mobile terminal is located. A method where individual terminal attributes, stored in a database, can be used to select a communication terminal is disclosed in Japanese Patent Publication No. Hei 10-326241, No. Hei 8-256142, No. Hei 10-322397 and No. Hei 9-91358. Furthermore, a method for measuring the strength and phase of signals exchanged by three base stations and a mobile terminal for use in specifying the location of the mobile terminal is disclosed in Japanese Patent Publication No. Hei 10-234071.

However, when the only correspondence is that between a communication area and the location of a mobile terminal, it is not always possible to designate a specific location and to select a communication designation. When, for example, railway stations B and C are included in communication area A and a communication destination is to be selected as a "mobile terminal in communication area A," those mobile terminals not only near station B but also near station C are selected as communication destinations while a mobile terminal near station B cannot be selected.

Likewise, when railway station D is included in both communication areas E and F, and a terminal near station D is to be selected as a communication designation, mobile terminals that communicate with base stations in communication areas E and F are selected, but a mobile terminal near station D that communicates only with a base station in communication area F cannot be selected. Even if a communication area wherein a mobile station is present is added to a database for the selection of a mobile terminal for communication, the above problems are not resolved.

In addition, conventionally, to select a communication terminal, the communication area for a communication destination and a time zone cannot be designated based on the detected location of a single mobile terminal, or the attributes (hobbies, age, etc.) of a recipient cannot be designated.

Therefore, one object of the present invention is to provide a mobile communication system for designating a specific location and for selecting a call destination and a method therefore.

It is another object of the present invention to provide a mobile communication system and a method for designating a specific location, a time zone and an attribute to select a call destination.

SUMMARY OF THE INVENTION

To achieve the above objects, according to the present invention a first mobile communication system, for calling one or more mobile stations located within a designated communication area, comprises: location storage means, for storing the locations of the mobile stations; designation accepting means, for at the least accepting the designation of the communication area; mobile station selection means, based on the accepted communication area and the stored locations of the mobile stations to select the mobile stations to be called; and calling means, for calling the mobile stations selected as the mobile stations to be called.

Preferably, in a mobile communication system for placing calls in a designated time zone to one or more mobile stations located within a designated communication area, at the least, the designation accepting means accepts the designation of the time zone and the mobile station selection means selects the mobile stations to be called, based on the accepted communication area and the time zone and the stored locations of the mobile stations.

Preferably, a mobile communication system comprises: a base station to be connected by radio to the mobile stations; and a calling device, which includes the location storage means, the designation accepting means, the mobile station selection means and calling means, for calling the mobile stations via the base station, wherein each of the mobile stations includes location detection means for detecting the location of a mobile station, and location notification means for notifying the calling device of the detected location of the mobile station.

The first mobile communication system uses a portable telephone network composed of base station communication areas, each of which has a radius of several kilometers. This system does not place calls to mobile stations located in the communication area of a specific base station, but instead accepts the designation of an absolute communication area and places calls to mobile stations located in that area.

Incorporated in each mobile station in the first mobile communication system is a GPS (Global Positioning System) device. An individual mobile station uses a GPS device to determine its current location (latitude and longitude), which it thereafter transmits to a server via a mobile communication network and the Internet.

In a mobile station, the location detection means, which is constituted by the above described GPS device, detects the location (latitude and longitude) of the mobile station periodically, or upon the receipt of a request from a server. For a mobile station, periodically, or upon the receipt of a request from a server, the location notification means uses the short mail format, which is the common method for the communication of characters between a PDA and a portable telephone, to transmit to the server the most recently detected location of the mobile station.

In the server, the location storage means stores and manages mobile station location data (latitudes and longitudes, or corresponding coordinates) received from the mobile stations in the short mail format (or in the normal mail format when the short mail has been converted into normal mail (Internet mail) at the gateway linking the Internet to the mobile communication network). That is, the location storage means serves as a database for the storage and the management of the locations of the individual mobile stations. At the server, the designation accepting means accepts the designation of a communication area (latitude and longitude, or corresponding coordinates) wherein a mobile station to be called is located, and also accepts the designation of a time zone wherein the mobile station to be called is located. For the server, the mobile station selection means searches the database to select a mobile station present in the accepted communication area. At the server, the calling means places a call to a selected mobile station in the designated time zone. When a communication path has been established with the mobile station to be called, the server then provides information to that station.

According to the present invention, provided is a second mobile communication system for providing information concerning one or more mobile stations located within a designated communication area, each of the mobile stations comprising: designation accepting means, for at the least accepting the designation of the communication area; information transmission means, for transmitting to another mobile station information including the designation of the accepted communication area; information receiving means, for receiving the transmitted information; location detection means, for detecting the location of a mobile station; and information provision means, for providing information when the detected location of the mobile station is within the communication area included in the received information.

Unlike the first mobile communication system, the second mobile communication system is provided by using a PHS communication network, wherein a base station has a communication area with a radius of about 100 meters, or by using both a PHS communication network and a portable telephone system. This system provides adequate means for direct communications between mobile stations, without a sever being required. In this system, one mobile station transmits information to other mobile stations and at the same time designates a communication area, and each of the other mobile stations determines whether it is located within the designated communication area. When a mobile station determines it is located within the designated area, it displays the information that it receives.

In a mobile station that acts as an information source, the designation accepting means accepts the designation of the locational range (latitude and longitude, or corresponding coordinates) of a mobile station to receive a call. For the mobile station that acts as an information source, the information transmission means uses, for example, the short mail format to transmit, to the other mobile stations, desired information and information concerning the designation of the communication area. In each mobile station, the information receiving means receives a short mail including the desired information and the information for designating the communication area. For each mobile station, the location detection means is constituted, for example, by one of the above described GPS devices, which is used to detect the location of the mobile station (latitude and longitude, or corresponding coordinates). At each mobile station, when the thus detected location (latitude and longitude, or corresponding coordinates) of the mobile station lies within the communication area (longitude or latitude, or corresponding coordinates) that is described in the received short mail, on a display device the information provision means displays, for a user, the information included in the short mail. If the location of the mobile station is outside the communication area designated in the short mail, the information provision means does not display the included information for a user.

According to the present invention a first mobile communication method, for calling one or more mobile stations located within a designated communication area, comprises the steps of: storing the locations of the mobile stations; at the least, accepting the designation of the communication area; based on the accepted communication area and the stored locations of the mobile stations to select the mobile stations to be called; and calling the mobile stations selected as the mobile stations to be called.

Provided is a second mobile communication method for providing information concerning one or more mobile stations located within a designated communication area, each of the mobile stations, at the least, accepts the designation of the communication area; transmits to another mobile station information including the designation of the accepted communication area; receives the transmitted information; detects the location of a mobile station; and provides information when the detected location of the mobile station is within the communication area included in the received information.

According to the present invention, provided is a first recording medium for each of mobile stations of a mobile communication system that comprises a base station to be connected by radio to the mobile stations, and a calling device that includes location storage means, designation accepting means, mobile station selection means and calling means for calling the mobile stations via the base station, the first recording medium storing a program to permit a computer to execute the steps of: detecting the location of a mobile station; and notifying the calling device of the detected location of the mobile station.

According to the present invention, provided is a second recording medium for each of mobile stations of a mobile communication system for providing information concerning one or more mobile stations located within a designated communication area, the second recording medium storing a program to permit a computer to execute the steps of: at the least, accepting the designation of the communication area; transmitting to another mobile station information including the designation of the accepted communication area; receiving the transmitted information; detecting the location of a mobile station; and providing information when the detected location of the mobile station is within the communication area included in the received information.

BRIEF DESCRIPTION OF THE DRAWINGS

FIG. 6 is a diagram showing a personal information table managed in a personal DB (FIG. 3).

FIG. 7 is a diagram showing a time-space information table managed in a time-space DB in FIG. 3.

Figure 1:
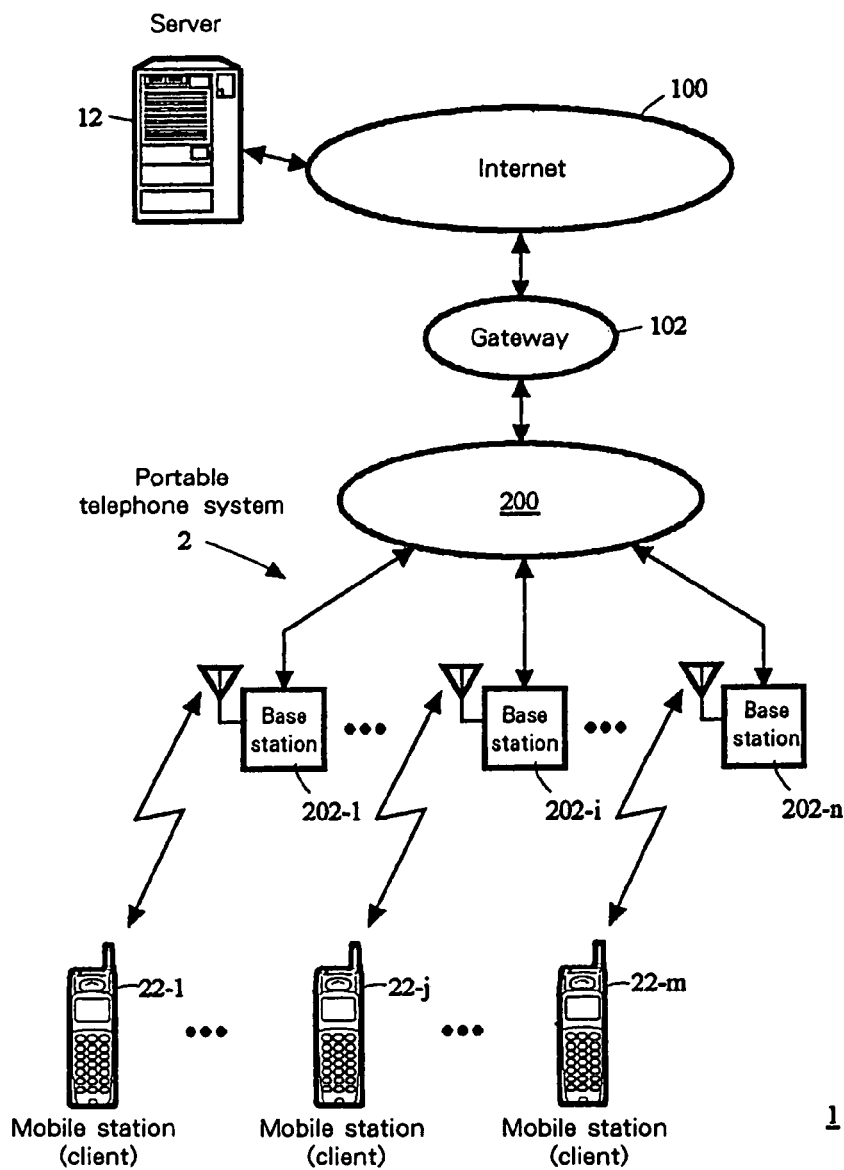
FIG. 1 is a diagram showing an example arrangement for a first communication system for which a first mobile communication method according to a first embodiment of the present invention is applied.

As is shown in FIG. 1, the component parts of the system 1 are a portable telephone system 2, a server 12, the Internet 100, and a gateway 102.

The portable telephone system 2 includes a wire communication network 200, a plurality of base stations 202-1 to 202-$i$ to 202-$n$ (one of which will, hereinafter, be referred to simply as a base station 202 when a particular base station is not specified), and a plurality of portable telephone mobile stations 22-1 to 22-$j$ to 22-$m$ (one of which will, hereinafter, be referred to simply as a mobile station 22 when a particular base station is not specified).

It should be noted that a mobile station 22 is also described as a "client" to distinguish it from a server 12.

The communication system 1 accepts the designation of an area that is not related to the communication area of a base station 202, and places a call to a mobile station 22, in the designated area, for which it thereafter provides a service, such as the delivery of short mail (hereinafter, all mail is defined as e-mail when it is not otherwise specifically identified).

Internet 100

The Internet 100 facilitates the exchange of data by the server 12 and the gateway 102.

Gateway 102

The gateway 102 receives from the portable telephone system 2 short mail data in a format appropriate for internal transmission within the portable telephone system 2. The gateway 102 then converts the received short mail data to obtain normal mail (Internet mail) data in a format that can be transmitted across the Internet 100, and transfers the normal mail data to the Internet 100. The gateway 102 also performs reverse processing, thus implementing the bidirectional transmission of data between the portable telephone system 2 and the Internet 100.

Base Station 202

The base station 202 connects a mobile station 22 to the wire communication network 200, via a radio communication path of several kilometers, for the bidirectional transmission of audio data and short mail data between them.

Wire Communication Network 200

The wire communication network 200 includes a switching center, and provides a required function for portable telephone communications.

Whereas the wire communication network 200 receives data from the Internet 100 via the gateway 102, and transmits the data to the mobile station 22 via the base station 202, it receives data from the mobile station 22 via the base station 202, and transfers the data to the Internet 100 via the gateway 102.

In addition, the wire communication network 200 establishes a communication path with the base station 202, with which it exchanges audio data and short mail data.

Server 12

Figure 2:
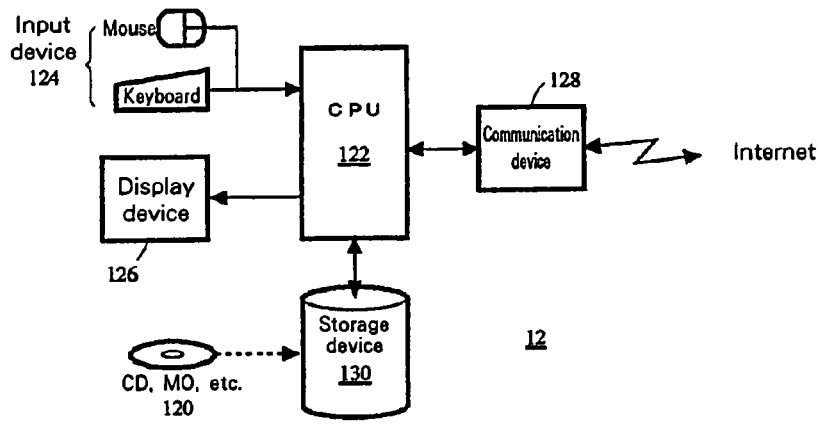
FIG. 2 is a diagram showing an example arrangement of a server in the communication system 1 in FIG. 1.

As is shown in FIG. 2, the server 12 comprises a CPU 122 including a micro processor, a memory and their peripheral circuits; an input device 124 including a mouse and a keyboard; a display device 126, such as a CRT display or a liquid crystal display device (LCD); a communication device 128, such as a modem or a terminal adaptor (TA), which is appropriate for use on the Internet 100; and a storage device 130, such as a hard disk drive, a CD-ROM drive or a magneto-optical disk (MO) for reading and writing data on a recording medium 120.

That is, the server 12 serves as a computer that has a communication function.

Figure 3:
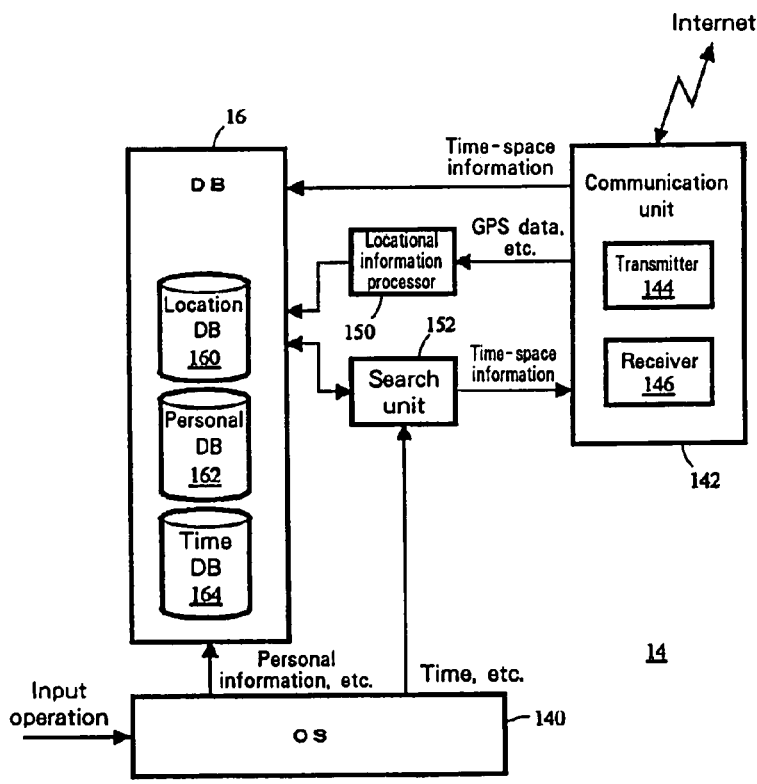
FIG. 3 is a diagram showing the structure of a server program executed by the server in FIG. 1 or 2.

FIG. 3 is a diagram illustrating an example arrangement used for a server program 14 which is executed by the server 12 depicted in FIGS. 1 and 2. As is shown in FIG. 3, the server program 14 comprises an OS 140, a communication unit 142, a location information processor 150, a search unit 152 and a database (DB) 16. The DB 16 includes a location DB 160, a personal DB 162 and a transmission information (time-space information) DB 164. The communication unit 142 includes a transmitter 144 and a receiver 146.

The server program 14 recorded on the recording medium 120 (FIG. 2) is supplied to the server 12, is loaded from the storage device 130 into the memory (not shown) of the CPU 122, and is executed. With these components of the server program 14, location data received from the mobile stations 22 and personal information of users who use the mobile stations 22 are stored in a database, one or more mobile stations 22 located in a designated communication area are called in a designated time zone, and short mail data are transmitted thereto.

OS 140

The OS 140 is an operating system, such as Windows (trademark of Microsoft Corp.) or OS/2 (trademark of IBM Corp.), that manages and controls the execution of other software modules. The OS 140 supplies, for other software modules, a calendar and time information used to place a call to a mobile station 22 in a designated time zone. The OS 140 accepts data entered by a user (operator) at the input device 124 (FIG. 2), and accepts other data designated by another operator and entered via the input device 124, or the storage device 130, and displayed on a display/input device 226 of a mobile station 22, a communication destination, for the user. The OS 14 transmits these data to the constituents (the transmitter 144, etc.) of the server program 14.

To simplify the drawing, as needed, data exchanged by the OS 140 and the other components are not shown in FIG. 3.

Receiver 146

The receiver 146 of the communication unit 142 receives mail from mobile stations 22 via the Internet 100, extracts GPS data for the transmission of locational information (latitude and longitude, or corresponding coordinates) concerning each mobile station 22 from which mail is received, and outputs the GPS data to the locational information processor 150.

Transmitter 144

The transmitter 144 generates one or more mail messages that include the user name of the mobile station 22 included in the search results received from the search unit 152, and information, such as that received from the OS 140 (specifically, in the first embodiment, information included in the first article of a transmission information table that will be described later while referring to FIG. 7; and that hereinafter will be referred to simply as time-space information, as it includes communication area of both of time zone and communication destination). Then, via the Internet 100, the transmitter 144 transmits the mail to a mobile station 22 that has been designated a communication destination.

Locational Information Processor 150

Figures 4, 5:
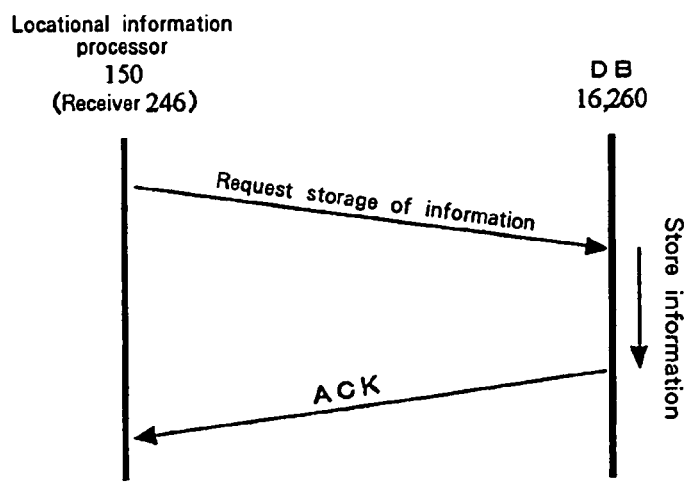
FIG. 4 is a sequence diagram showing the processing performed by the locational information processor and the OS of the server program to store information in a DB.
FIG. 5 is a diagram showing a locational information table managed in the location DB of the server program shown in FIG. 3.

FIG. 4 is a sequence diagram showing the processing performed by the locational information processor 150 and the OS 140 of the server program 14 when entering information in the DB 16. As is shown in FIG. 4, the locational information processor 150 outputs, to the location DB 160 of the DB 16, locational information indicated by GPS data received by the receiver 144 from the mobile stations 22, and the corresponding user names of the mobile stations 22. In reply, the location DB 160 transmits an ACK signal to the locational information processor 150.

Location DB 160

FIG. 5 is a diagram showing a locational information table managed by the location DB 160 of the server program 14 in FIG. 3; FIG. 6 is a diagram showing a personal information table managed by a personal DB 162; and FIG. 7 is a diagram showing a transmission information table (time-space information table) managed by a time-space DB 164. The locational information of the mobile stations 22 is received from the locational information processor 150, and the corresponding user names of the mobile stations 22 are received via the OS 140 from the input device 124 or the storage device 130. Thereafter, a location management table, such as is shown in FIG. 5, is prepared, stored and managed in the location DB 160 of the DB 16. A user name is the portable telephone number of a mobile station 22 in the portable telephone system 2, and is also used as an e-mail address. When, for example, the telephone number of a mobile station 22 for a specific user is XXX-XXXX-XXXX, an e-mail address of XXXXXXXXXXX@ABC.ne.jp (ABC is the provider's name), for example, is provided for that mobile station 22.

Personal DB 162

A personal information table such as that shown in FIG. 6 is prepared (hereinafter, an entry in the personal information table is simply described as personal information) by correlating the user name of the mobile station 22, received via the OS 140, with personal information, such as the hobbies and the personal tastes of the user of the pertinent mobile station 22, that is also received via the OS 140. The thus prepared table is stored and managed in the personal DB 162. The personal DB 162 accepts information set up in the same manner as that provided for the location DB 160.

Time-Space DB 164

The transmission information table (a time-space information table) shown in FIG. 7 is prepared by correlating all the types of information (a message ID, a category, an effective time, an effective range designation method, an effective range, the maximum number of communication destinations, and the contents) that are received via the OS 140. The thus prepared transmission information table is stored and managed in the time-space DB 164. The time-space DB 164 also accepts information set up in the same manner as that provided for the location DB 160. In the transmission information table (the time-space information table), information correlated with a user name will be as described below. The information entered by column across each line (each line: time-space information) of the transmission information table (time-space information table) is that which as the contents of short mail is exchanged by the server 12 and the mobile station 22.

Contents of Time-Space Information Table

The transmission information table (the time-space information table in FIG. 7) will now be described.

Under "Creator" is entered the user name who prepared the transmission information (time-space information).

Under "Message ID" is entered a number, uniquely provided for each user name, with which it is possible, by designating the locational range of a transmission destination and a transmission time zone, to identify the time-space information type to be provided for the mobile station 22.

The "Message ID" is used by the mobile station 22 to manage received time-space information.

Under "Category" is entered an attribute used to determine a reduced number of distribution destinations of transmission information (time-space information) when, for example, the number of mobile stations 22 present in an "Effective range" described below exceeds the "Maximum number of recipients." For example, a symbol that corresponds to the hobby or the tastes of a user is entered in the "Category" column.

For "Effective time," an 8-digit numeral set is entered, in which month, day, hour and minute are each represented by two numerals. When, for example, the 8-digit numerical set "aabbccdd" is entered in the "Effective time" column, month is represented by aa, day by bb, hour by cc, and minutes by dd. The "Effective time" provides the date on which transmission information (time-space information) becomes invalid. That is, the time-space information is transmitted in a time zone extending from the setup of that information to the date described in the "Effective time," and is not transmitted after the effective time.

Entered under "Effective range designation method" is a method for designating the locational range of a distribution destination of short mail including transmission information (time-space information). When, for example, "1" is entered for the "Effective range designation method," it means that the absolute effective range designation method is used. When "2" is entered, it means that the relative effective range designation method is used.

Entered in the "Effective range" column are numerical values, prepared in accordance with the "Effective range designation method" entry, that specifically limit the locational range of a distribution destination of short mail. Specifically, when "1" (absolute effective range designation method) is entered for the "Effective range designation method," provided as the "Effective range" is a set of three numerical values comprising the latitude and the longitude at the center of the locational range of a mail distribution destination and the radius of the range. But when "2" (relative effective range designation method) is entered for the "Effective range designation method," provided as the "Effective range" is a pair of two numerical values comprising the user name (a portable telephone number) of a mobile station 22 located at the center of the locational range of a mail distribution destination and the radius of the range.

When the latitude and the longitude at the center of the effective range and the radius of the range are designated, whether the locations of individual mobile stations 22 fall within the effective range can be determined based, for example, on the method described in "Standards for survey of primary reference point in a precision geodetic network," issued by the "Japan Survey Institution." If, for example, the number of products is limited in the distribution of information (hereinafter referred to as the contents) for providing a product, a more preferable method may be to limit the number of designated mobile stations 22 as distribution destinations, rather than to distribute information to an indefinite number of mobile stations 22.

Under "Maximum number of recipients" is entered the maximum number of mobile stations 22 to which information is to be transmitted when the number of destinations is limited. If, however, "0" is entered for the "Maximum number of recipients," the number of mobile stations 22 that may receive information is not limited.

Entered under "Contents" are the contents of the information displayed on a display/input device 226 (which will be described later while referring to FIG. 9) of a mobile station 22 that is a distribution destination.

Search Unit 152

Figure 8:
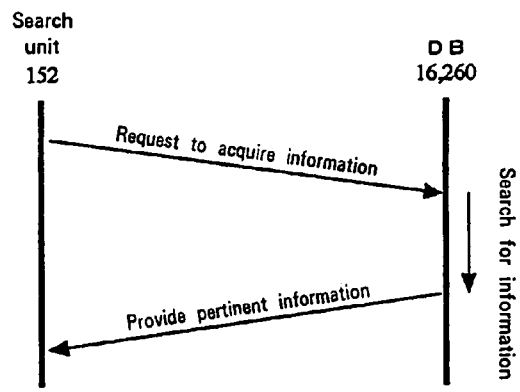
FIG. 8 is a sequence diagram showing the processing performed by the search unit of the server program (FIG. 3) when performing a search of information stored and managed in the DB.

FIG. 8 is a sequence diagram showing the processing performed by the search unit 152 of the server program 14 in FIG. 3 when performing a search of information stored and managed in the DB 16. As is shown in FIG. 8, the search unit 152 transmits a data acquisition request to the time-space DB 164, and receives in turn transmission information (time-space information), included in the transmission information table (time-space information table in FIG. 7), that is stored and managed in the time-space DB 164. At this time, when the time indicated by the data from the OS 140 falls within a time zone entered in the "Effective time" column (transmission information (time-space information)) of the transmission information table (time-space information table), which is stored and managed in the time-space DB 164, a search is made of the information (FIG. 5) stored and managed in the location DB 160, and the user name (user name A) corresponding to the locational range entered in the "Effective range" is selected.

Further, as is shown in FIG. 8, the search unit 152 performs a search of the information (FIG. 6) stored and managed in the personal DB 162, and selects personal information, which is input separately in order to further limit the transmission destinations of the information (contents of time-space information in FIG. 7), and a user name (user name B) entered in a row corresponding to the personal information. The search unit 152 selects a user name included in both these user names (user names A and B) as the user name of the mobile station 22 that is an actual transmission destination of the information (the contents of the time-space information in FIG. 7), and outputs the selected user name to the transmitter 144.

Figure 9:
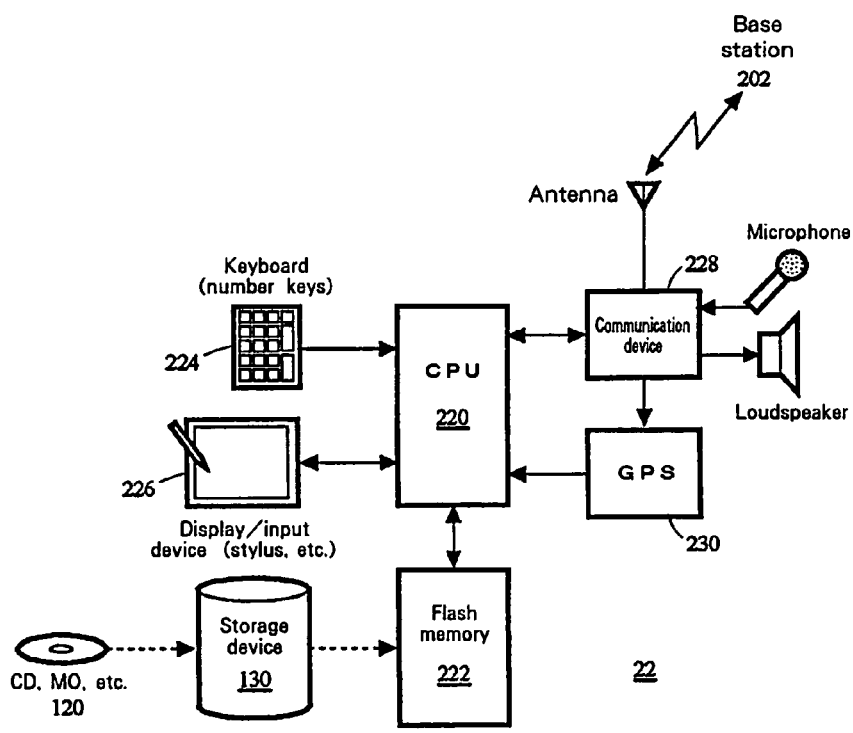
FIG. 9 is a diagram showing the arrangement of a portable telephone mobile station in the communication system shown in FIG. 1.

FIG. 9 is a diagram showing an example arrangement of one of the mobile stations 22 of the communication system 1 in FIG. 1. As is shown in FIG. 9, the mobile station 22 comprises a CPU 220, a flash memory 222, a keyboard (a number key pad) 224, a display/input device 226, a communication device 228 and a GPS device 230. In other words, the mobile station 22 has an arrangement whereby the GPS device 230 is additionally provided for a portable telephone that includes not only a speech function but also a short mail communication function.

CPU 220

The CPU 220, which is a so-called one-chip microprocessor, executes a portable telephone program (not shown) to provide the functions of a general portable telephone, i.e., a speech function and a short mail communication function. In addition, to carry out the mobile communication method of the present invention, the CPU 220 executes the client program 24 (which will be described later while referring to FIG. 10) stored in the nonvolatile memory (the flash memory 222) of the mobile station 22.

Display/Input Device 226

The display/input device 226 comprises an LCD display device and a transparent input tablet that is attached to the image display space of the LCD. The display/input device 226 accepts the manipulation data entered by the operation of a stylus at a GUI image on the LCD display device, and outputs the data to the CPU 220 (the client program 24). Also, information entered via the keyboard 224 and at the display/input device 226, and the contents of the time-space information in FIG. 7 included in received short mail, are displayed for a user on the display/input device 226.

GPS Device 230

The GPS device 230 receives a signal from an artificial satellite and detects the location of the mobile station 22. Thereafter, it generates GPS data (latitude and longitude, or corresponding coordinates) of the location of the mobile station 22 and outputs them to the CPU 220 (the client program 24).

Communication Device 228

The communication device 228 includes an antenna, a microphone and a loudspeaker for carrying out the speech function.

Furthermore, the communication device 228 permits the CPU 220 (the client program 24) and another mobile station 22, or the server 12, to exchange short mail via the base station 202, the wire communication network 200, the gateway 102 and the Internet 100, in order to carry out the short mail communication function.

Client Program 24

Figure 10:
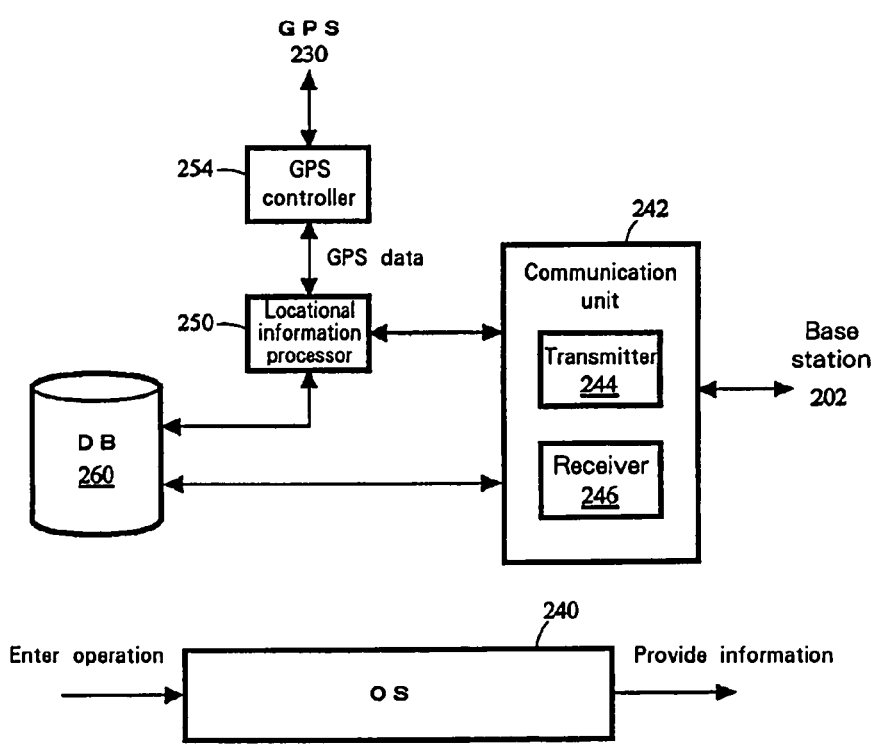
FIG. 10 is a diagram showing the arrangement of a client program executed by the mobile station shown in FIG. 1 or 9.
Figure 22:
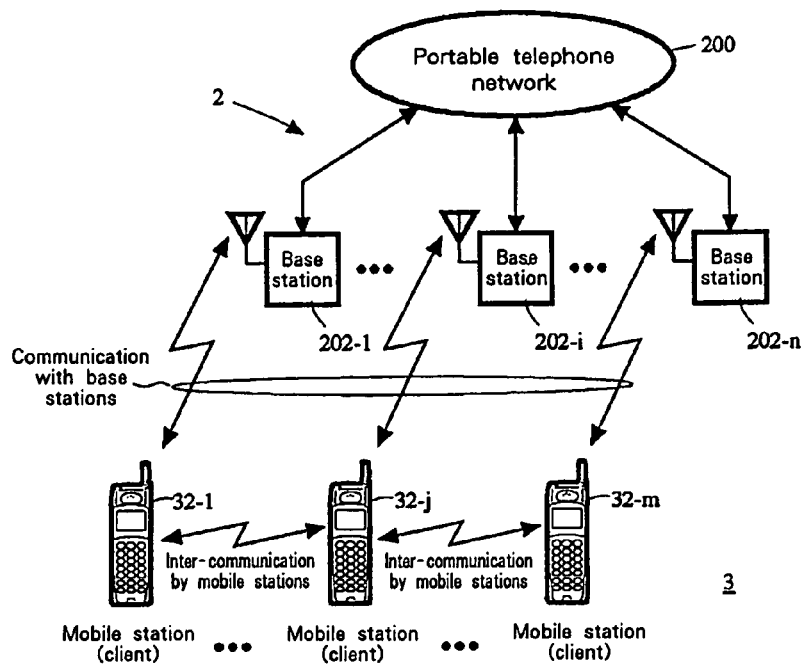
FIG. 22 is a diagram showing an example arrangement for a communication system for which a mobile communication method according to a second embodiment of the present invention is applied.

FIG. 10 is a diagram illustrating the arrangement of a client program 24 that is executed by the mobile stations 22 and 32 shown in FIGS. 1 and 22.

As is shown in FIG. 10, the client program 24 is constituted by an OS 240, a communication unit 242, a GPS controller 254, a locational information processor 250, and a DB 260. The communication unit 242 includes a transmitter 244, and a receiver 246. As is described above, a program of the speech function that is not directly related to the mobile communication method of the present invention is not shown in FIG. 10. The client program 24 is, for example, recorded on the recording medium 120, is supplied to the mobile station 22, is loaded into the flash memory 222 via the storage device 130 that can be connected to the mobile station 22, and is executed by the CPU 220. With this arrangement, upon receiving a request from the server 12 (the server program 14), the client program 24 transmits short mail consisting of GPS data for the location of the mobile station 22, or displays on the display/input device 226 the contents of time-space information shown in FIG. 7 that is received from the server 12.

OS 240

The OS 240 is an operating system, such as Windows CE (trademark of Microsoft Corp.), that is appropriate for a portable telephone terminal or a PDA, and executes and manages the individual sections of the client program 24. In addition, the OS 240 outputs, to the individual sections, data input entered by a user via the keyboard 224 and the display/input device 226, and information required to execute the client program 24. To simplify FIG. 10, the exchange of data by the OS 240 and the other components is not shown.

GPS Controller 254

The GPS controller 254 controls the GPS device 230 (FIG. 9). The GPS controller 254 uses data received from the GPS device 230 to generate GPS data for the location (latitude and longitude) of the mobile station 22, and outputs the GPS data to the locational information processor 250.

Receiver 246

The communication unit 242 establishes a radio communication path of several kilometers with the base station 202. The receiver 246 of the communication unit 242 receives short mail from the server 12 via the Internet 100, and outputs data included in that mail to the locational information processor 250. In order to provide for the user the contents of the time-space information described in FIG. 7, which are included in the received short mail, the receiver 246 displays them on the display/input device 226. Also, the receiver 246 outputs to the DB 260 the time-space information included in the received short mail.

DB 260

The DB 260 is used to store and manage time-space information transmitted by the receiver 246, and in accordance with the entries effected by the user at the mobile station 22, the contents of the time-space information in FIG. 7 are displayed on the display/input device 226. The DB 260 is also used for a overlapping reception prevention process whereby, even when the mobile station 22 receives, on a number of occasions, short mail including the same time-space information, the overlapping storage of the same information at the mobile station 22 is prevented based on information, such as a message ID, included in the time-space information. The transmission of the time-space information by the receiver 246 to the DB 260, and the response (the return of an ACK) transmitted by the DB 260 to the receiver 246 are performed in the same manner as is shown in FIG. 4.

Locational Information Processor 250

Upon receiving a request from the server 12 (server program 14), the locational information processor 250 acquires GPS data from the GPS controller 254 and outputs them to the transmitter 244, and notifies the server 12 (server program 14) of the location (latitude and longitude) of the mobile station 22.

Transmitter 244

The transmitter 244 of the communication unit 242 generates short mail including GPS data received from the locational information processor 250, and transmits the mail to the server 12 via the Internet 100. In accordance with the manipulation by a user of the keyboard 224 and the display/input device 226, the transmitter 244 creates the time-space information in FIG. 7, which is to be transmitted to the other mobile stations 22, and in addition, prepares short mail including the time-space information and the designation of a locational range, and transmits the mail to the server 12. In addition, as needed, the transmitter 244 accepts personal information from the personal information table (FIG. 6), that the server 12 will use to reduce the number of mobile stations 22 (user names) for the distribution of information, adds the personal information to the short mail, together with the time-space information, and transmits the resultant short mail.

Operation of Communication System 1

The operation of the communication system 1 is described while referring to FIGS. 11 to 21.

Mail Communication Processing

First, the mail communication processing performed by the communication system 1 will be described.

Figure 11:
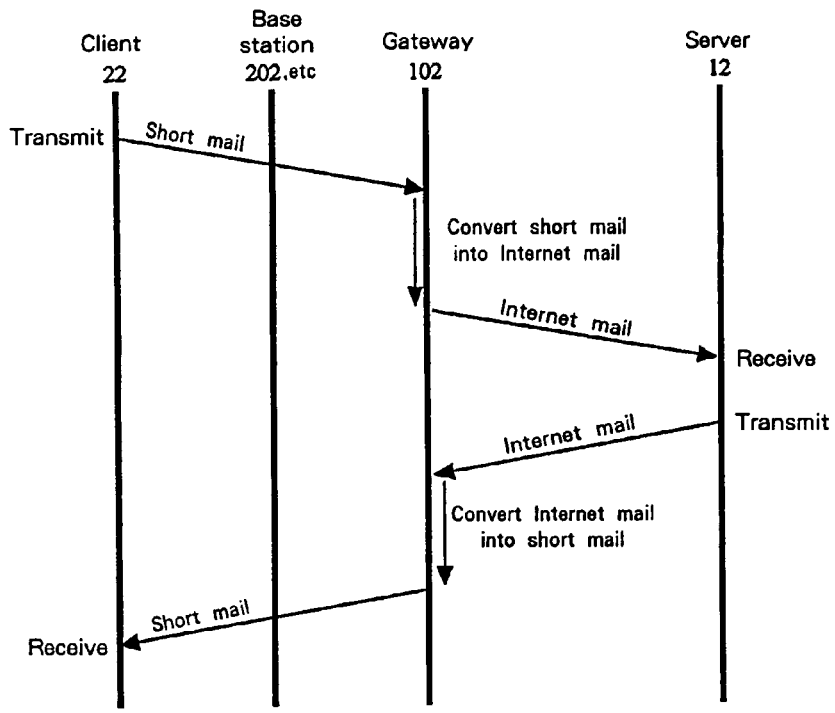
FIG. 11 is a sequence diagram showing the mail communication processing performed by the communication system (FIG. 1).

FIG. 11 is a sequence diagram showing the mail communication processing performed by the communication system 1 in FIG. 1. As is shown in FIG. 11, the mobile station 22 (a client, in FIG. 1 or 9) transmits short mail having a transmission form appropriate for the portable telephone system 2, and the gateway 102 receives the short mail via the base station 202 and the wire communication network 200. The gateway 102 converts the received short mail into a normal mail form (Internet mail form) appropriate for transmission across the Internet 100, and transmits the mail to the server 12 across the Internet 100. The server 12 thereafter receives the Internet mail transmitted by the gateway 102. In like fashion, when the server 12 transmits Internet mail, the gateway 102 receives it via the Internet 100. Subsequently, the gateway 102 converts the received Internet mail into short mail, and transmits the short mail to the mobile station 22 via the wire communication network 200 and the base station 202. Finally, the mobile station 22 receives the short mail from the server 12.

Locational Information Collection Processing

Figure 12:
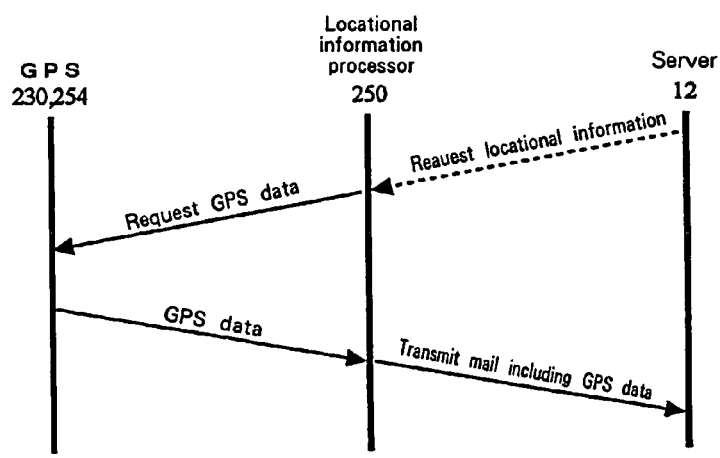
FIG. 12 is a flowchart showing the locational information collection processing performed by the communication system (FIG. 1).

An explanation will now be given while referring to FIG. 12 for the processing performed by the server 12 (FIG. 1 or 2) when collecting locational information for the locations (latitudes and longitudes) of the individual mobile stations 22. FIG. 12 is a sequence diagram showing the locational information collection processing for the communication system 1 (FIG. 1).

As is shown in FIG. 12, the locational information processor 250 (FIG. 10) of the mobile station 22 (FIG. 1 or 9) requests GPS data from the GPS controller 254 periodically, or when the mobile station 22 receives from the server 12 short mail requesting the locational information. The GPS controller 254 permits the GPS device 230 to determine the location (latitude and longitude) of the mobile station 22, receives the obtained GPS data for the location of the mobile station 22, and transmits to the server 12 short mail in which the GPS data is included. Upon receiving the short mail from the mobile station 22, the server 12 stores and manages in the locational information table (FIG. 5) the user name included in the short mail and the corresponding locational information (latitude and longitude).

Time-Space Information Transmission Processing

Figure 13:
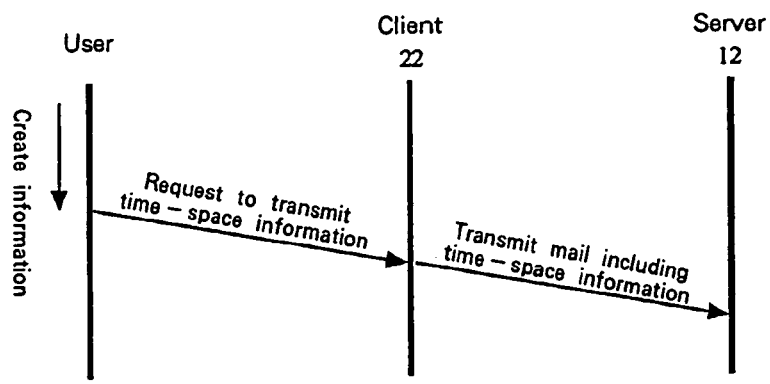
FIG. 13 is a sequence diagram showing the processing performed by the communication system (FIG. 1) whereby a user prepares time-space information (FIG. 7) and transmits it to the server 12.

An explanation will now be given, while referring to FIG. 13, of the processing performed when the time-space information in FIG. 7 is transmitted by the mobile station 22 to the server 12. FIG. 13 is a sequence diagram showing the process of the communication system 1 (FIG. 1) that a user prepares time-space information (FIG. 7) and to transmit it to the server 12. As is shown in FIG. 13, the user prepares time-space information by using, for example, the keyboard 224 and the display/input device 226 of the mobile station 22 (FIG. 1 or 9), and requests that the mobile station 22 transmit the time-space information. Then, the mobile station 22 transmits to the server 12 (FIG. 1 or 2) short mail including the time-space information. The server 12 receives the short mail transmitted by the mobile station 22 as Internet mail, and stores and manages, as one entry in the transmission information table (time-space information table in FIG. 7) in the time-space DB 164, the time-space information included in the Internet mail.

Personal Information Transmission Processing

Figure 14:
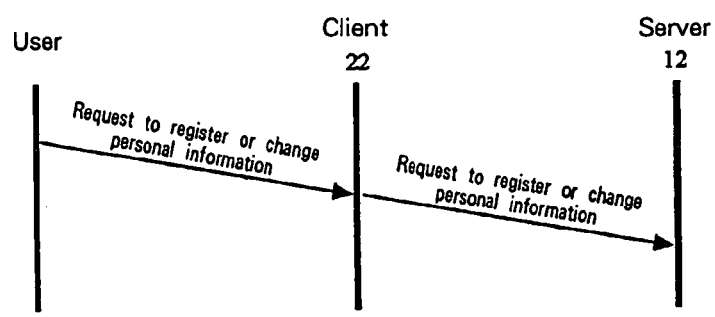
FIG. 14 is a sequence diagram showing the processing performed by the communication system (FIG. 1) whereby a user prepares personal information (FIG. 6) and transmits it to the server 12.

An explanation will now be given while referring to FIG. 14 for the processing performed for the transmission by the mobile station 22 of personal information (FIG. 6) to the server 12. FIG. 14 is a sequence diagram showing the processing performed by the communication system 1 (FIG. 1) when a user prepares personal information (FIG. 6) and transmits it to the server 12. As is shown in FIG. 14, the user uses the keyboard 224 and the display/input device 226 of the mobile station 22 (FIG. 1 or 9) to create personal information describing an attribute, such as the user's taste, and requests that the mobile station 22 transmit the personal information. Then, the transmitter 244 (FIG. 10) of the mobile station 22 transmits, to the server 12 (FIG. 1 or 2), short mail in which is included the personal, user information (FIG. 6). The server 12 receives this short mail as Internet mail, and stores and manages, as one item in the personal information table (FIG. 6) in the personal DB 162, the personal information included in the Internet mail.

First Time-Space Information Transmission Processing

Figure 15:
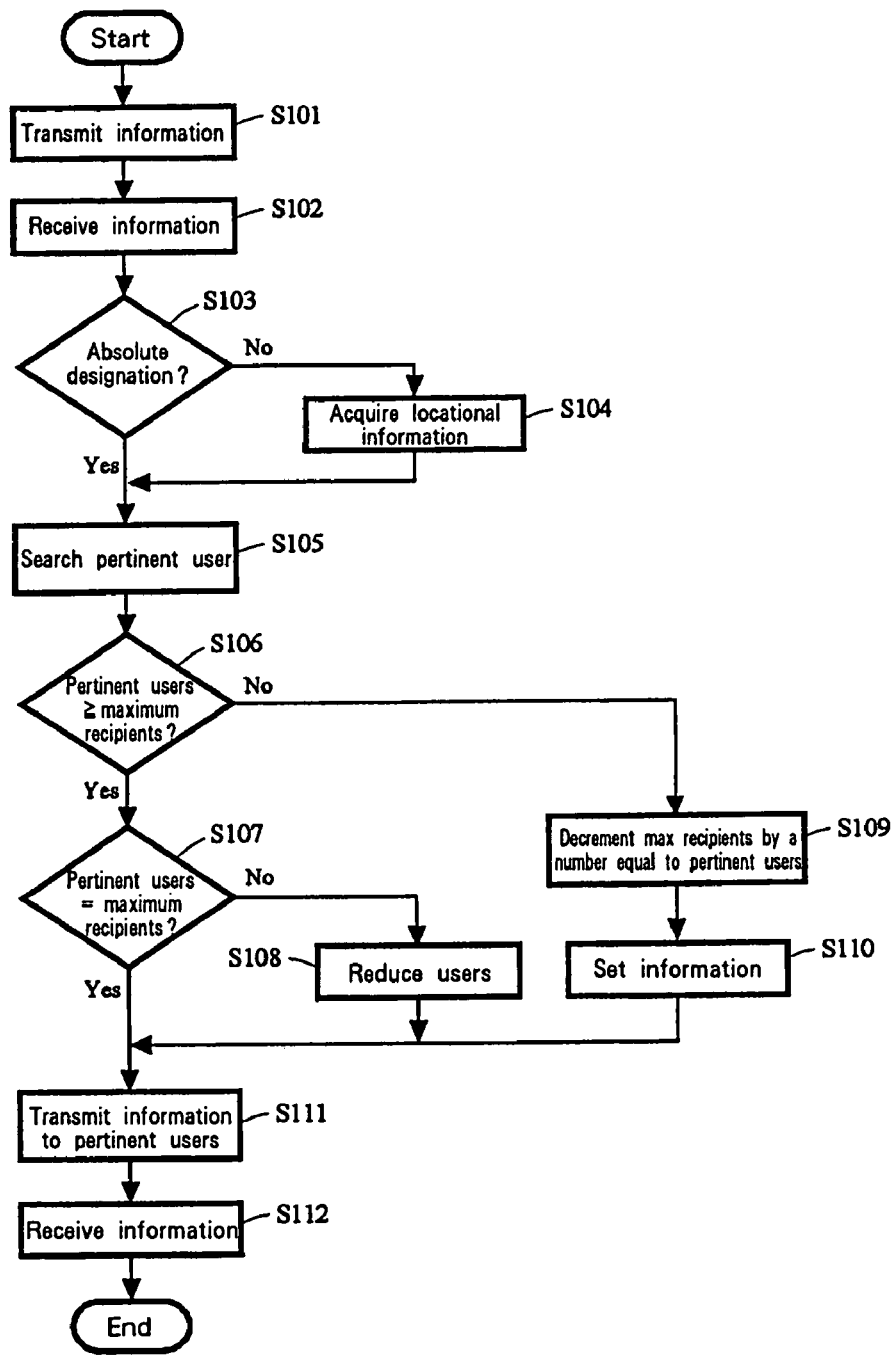
FIG. 15 is a flowchart showing the first time-space information transmission processing performed by the communication system (FIG. 1).
Figure 16:
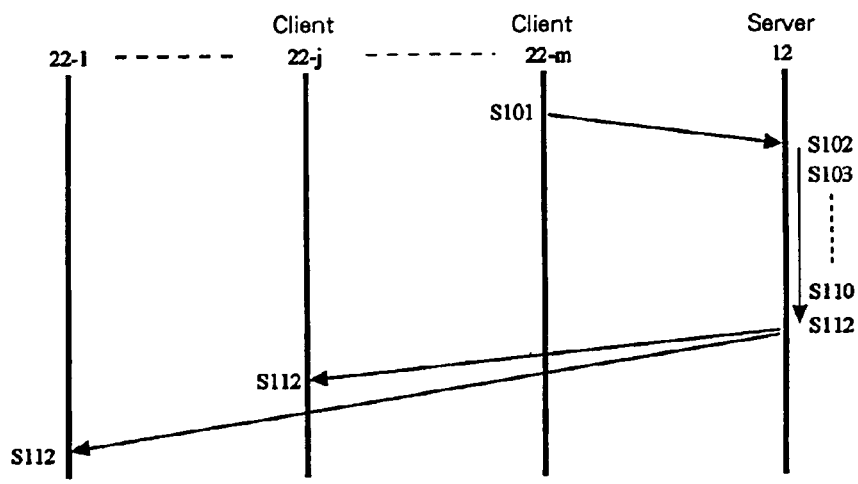
FIG. 16 is a sequence diagram showing the first time-space information transmission processing performed by the communication system (FIG. 1).

An explanation will now be given, while referring to FIGS. 15 and 16, for the first-time information transmission processing, whereby, when one of the mobile stations 22 (FIG. 1 or 9) transmits to the server 12 (FIG. 1 or 2) short mail including time-space information (FIG. 7) (FIG. 13), the server 12 transmits short mail to the mobile station 22. FIG. 15 is a flowchart showing the first time-space information transmission processing for the communication system 1 (FIG. 1). FIG. 16 is a sequence diagram showing the first time-space information transmission processing for the communication system 1 (FIG. 1).

As is shown in FIGS. 15 and 16, at step S101, for example, a mobile station 22-$m$ transmits to the server 12 short mail including time-space information as shown in FIG. 7.

At step S102, as is shown in FIG. 11, the receiver 146 of the server program 14 (FIG. 3), which is operated by the server 12, receives mail from the mobile station 22, and the time-space information included in the mail is stored and managed in the transmission information table (the time-space information table in FIG. 7) in the time-space DB 164.

At step S103, the search unit 152 of the server program 14 (FIG. 3) operated by the server 12 examines the effective range designation method (FIG. 7) used for the time-space information included in the received mail. Since the entry value is 1 and the effective range is designated by an absolute location, program control moves to step S105. In the other cases, since the effective range is designated relative to the location of one of the mobile stations 22, program control moves to step S104.

At step S104, the search unit 152 searches the locational information table (FIG. 5) in the location DB 160 by using the first value (the user name, e.g., 090456789012, the first numerical value (the user name) in the effective range of the second row in FIG. 7) in the effective range of the time-space information included in the mail. As a result of the search, the search unit 152 obtains the locational information (in this case, lat. 36° 32'10"N. and long. 139° 03'35"E.) of a mobile station 22 designated as the center of the effective range.

At step S105, the search unit 152 searches the locational information table (FIG. 5) in the location DB 160 by using the locational information of the center of the effective range directly designated by the time-space information, or obtained at step S104, and acquires the user names of all the mobile stations 22 present within an area described by a designated radius originating at the center of the effective range.

At step S106, the search unit 152 determines whether the number, obtained at step S105, of mobile stations 22 located in the effective range is greater than or equals the maximum number of recipients designated in the time-space information. If the number of the pertinent mobile stations 22 is greater than or equals the maximum number of recipients, program control advances to step S107. In the other cases, program control moves to step S109.

At step S107, the search unit 152 determines whether the number of the pertinent mobile stations 22 is equal to the maximum number of recipients. If these two numbers match, program control moves to step S111. In the other case, program control goes to step S108.

At step S108, the search unit 152 searches personal information table (FIG. 6) in the personal DB 162 by using the entry for the time-space information category, and obtains the user names of the mobile stations 22 for which personal information matches the entry in the category, so that the number of user names is reduced and the number of the pertinent mobile stations 22 is equal to or smaller than the maximum number of recipients.

At step S109, in accordance with the number of users obtained at step S105, the search unit 152 reduces the maximum number of recipients in a corresponding row in the time-space information table (FIG. 7) in the time-space DB 164. The search unit 152 then sets new obtained information in the pertinent row (S110).

At step S111, the search unit 152 outputs, to the transmitter 144, the user names of the mobile stations 22 selected as distribution destinations of the time-space information in FIG. 7.

At step S112, the transmitter 144 prepares short mail including the received time-space information and addressed to the individual user names received from the search unit 152. Then, the transmitter 144 transmits the obtained short mail to the mobile stations 22 selected as destinations.

A further explanation of the first time-space information transmission process will given where a creator included in the time-space information in the short mail received by the server 12 is 09045678901; a message ID is 2001; a category is C, the effective time is 08221900; the effective range designation method is 1 (absolute); the effective range is 35° 17'00" and 139° 11'00" with a radius of 10000 meters; and the maximum number of recipients is 2.

When, at step S103, the value of the effective range designation method included in the time-space information is 1 (absolute), program control moves to step S105.

At step S105, the server 12 searches the locational information table (FIG. 5) by using the effective range (35° 17'00" and 139° 11'00" with a radius of 10000 meters) that is directly designated in the time-space information, and obtains the user names (09012345678, 09023456789 and 09034567890) of the three pertinent mobile stations 22.

When, at step S106, the number of mobile stations 22 obtained at step S105 exceeds the maximum recipient number of 2, program control moves to step S107.

When, at step S107, the number of the pertinent mobile stations 22 is not equal to the designated maximum number of recipients, program control goes to step S108.

At step S108, the server 12 searches the personal information table (FIG. 8) for the user names of the mobile stations 22 in category C, and reduces the user names to two (09012345678 and 09034567890). Program control thereafter goes to step S111.

At step S111, the server 12 selects user names (09012345678 and 09034567890) as the distribution destinations of the time-space information in FIG. 7.

At step S112, the server 12 prepares short mail including the received time-space information and addressed to the selected user names (09012345678 and 09034567890), and transmits the short mail to the mobile stations 22 selected as distribution designations.

Second Time-Space Information Transmission Processing

Figure 18:
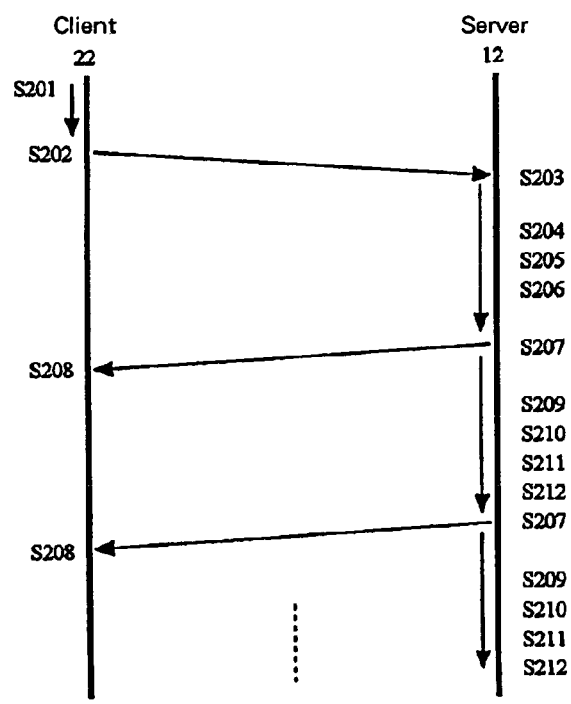
FIG. 18 is a sequence diagram showing the second time-space information transmission processing performed by the communication system (FIG. 1).
Figure 17:
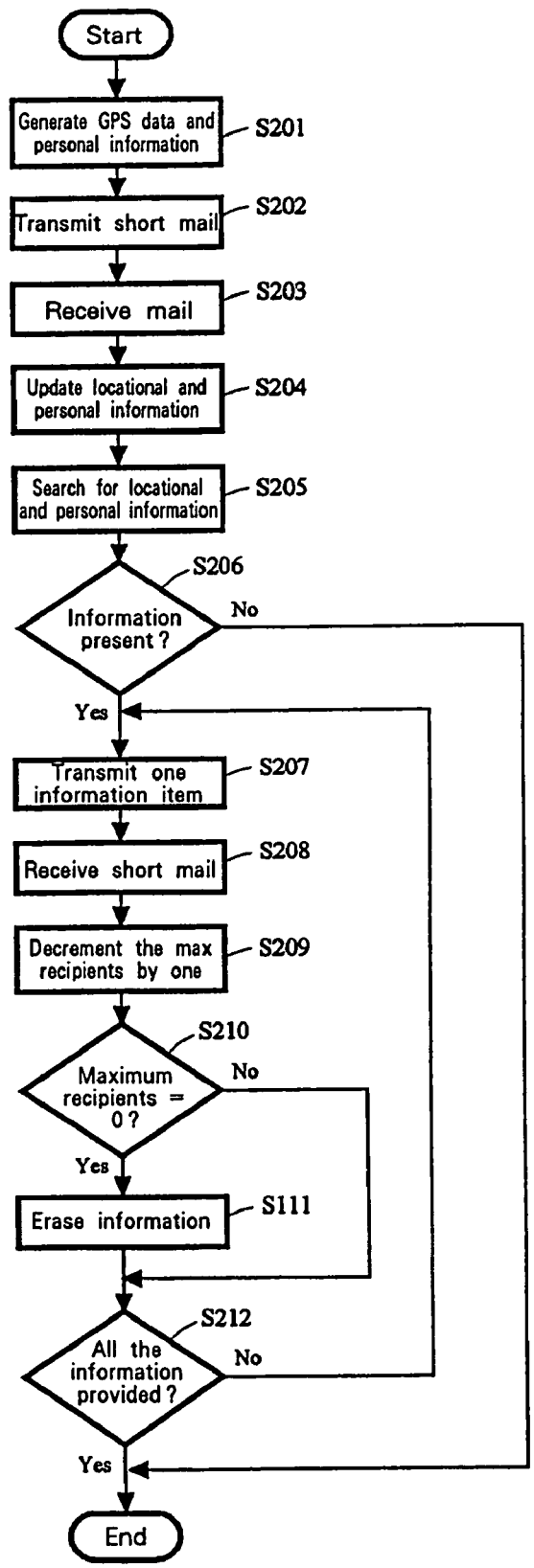
FIG. 17 is a flowchart showing the second time-space information transmission processing performed by the communication system (FIG. 1).

An explanation will now be given, while referring to FIGS. 17 and 18, for the second time-space information transmission processing whereby, when as is shown in FIG. 12 or 14 one of the mobile stations 22 (FIG. 1 or 9) transmits locational information (GPS data) or personal information to the server 12 (FIG. 1 or 2), the server 12 transmits short mail to the mobile station 22. FIG. 17 is a flowchart showing the second time-space information transmission processing performed by the communication system 1 (FIG. 1). FIG. 18 is a sequence diagram showing the second time-space information transmission processing performed by the communication system 1 (FIG. 1).

In FIGS. 17 and 18, at step S201, the locational information processor 250 of the client program 24 (FIG. 10) operated by the mobile station 22 periodically requests that the GPS controller 254 determine the location of the mobile station 22, as is shown in FIG. 12. Upon receiving the request, the GPS controller 254 generates GPS data of the location (latitude and longitude) of the mobile station 22. Or, in accordance with an entry by a user, the transmitter 244 generates personal information, as is shown in FIG. 14.

At step S202, the GPS controller 254 transmits the obtained GPS data to the transmitter 244, which in turn transmits to the server 12 short mail including the received GPS data.

Or, the transmitter 244 transmits to the server 12 short mail including the generated personal information.

At step S203, the transmitter 144 of the server program 14 (FIG. 3) operated by the server 12 receives the mail from the mobile station 22 and transmits it to the locational information processor 150.

At step S204, the locational information processor 150 uses the GPS data or the personal information included in the mail to update the entry in a row in the locational information table (FIG. 5) of the location DB 160, or the entry in a row in the personal information table in the personal DB 162, which corresponds to the transmission source mobile station 22.

At step S205, the search unit 152 uses the updated locational information or personal information to search the time-space information table in FIG. 7 that is stored and managed in the time-space DB 164.

At step S206, the search unit 152 determines whether the mobile station 22 has moved and whether its location has been entered in the effective range in at least one row of the time-space information table. If the location of the mobile station 22 falls in a specific effective range, the search unit 152 determines what time-space information is to be transmitted to the pertinent mobile station 22. Program control then goes to step S207. In addition, when the personal information of the user of the mobile station 22 is changed, the search unit 152 determines whether specific time-space information should be transmitted to the mobile station 22. The search unit 152 then determines what information should be transmitted, and program control thereafter advances to step S207. In the other case, the server program 14 terminates the processing.

At step S207, the search unit 152 transmits, to the transmitter 144, one of the time-space information items that, at step S206, it was determined should be transmitted. The transmitter 144 transmits mail in which the received time-space information is included to the mobile station 22 for which the locational information or the personal information has been changed.

At step S208, the mobile station 22 for which the locational information or the personal information has been updated receives the short mail from the server 12.

At step S209, the search unit 152 decrements by one the maximum number of recipients of the time-space information stored and managed in the time-space DB 164.

At step S210, the search unit 152 determines whether the maximum number of recipients obtained at step S209 is equal to 0. If it is equal to 0, program control advances to step S211. In the other case, program control moves to step S212.

At step S211, the search unit 152 erases time-space information for which the maximum number of recipients is 0.

At step S212, the search unit 152 determines whether all the necessary time-space information has been transmitted to the mobile station 22 for which the locational information or the personal information has been changed. When all the information has been transmitted, processing is thereafter terminated. In the other case, program control returns to step S207.

Time-Space Information Erasing by Server 12

Figure 19:
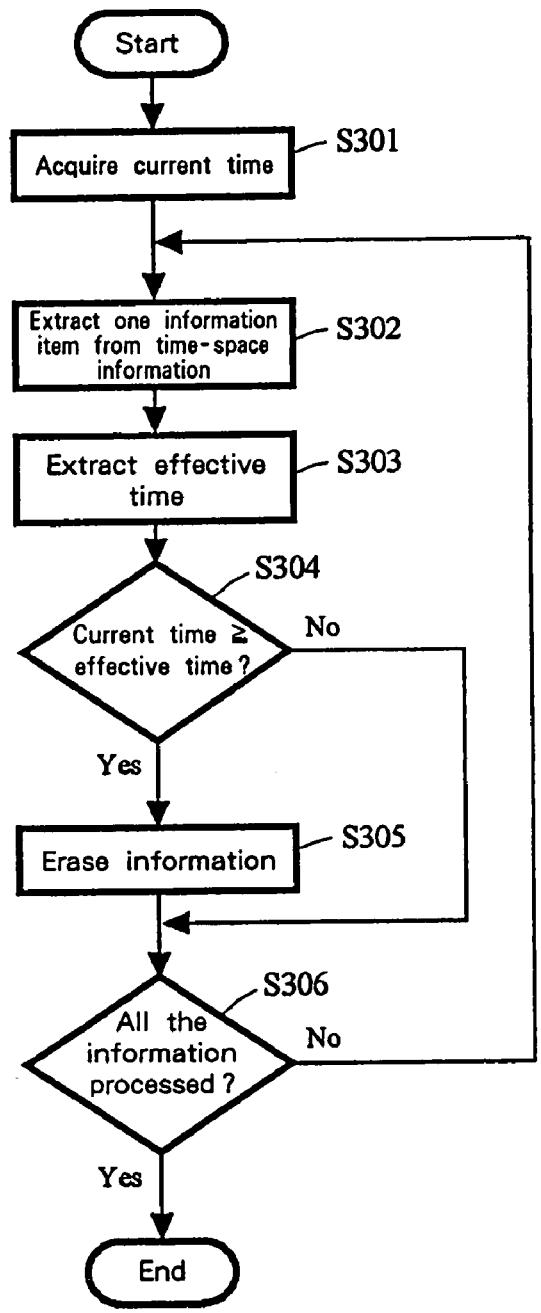
FIG. 19 is a flowchart showing the processing performed by the server (FIG. 1 or 2) to erase time-space information of which the effective time has expired.

An explanation will now be given while referring to FIG. 19 for the processing performed by the server 12 (FIG. 1 or 2) to erase time-space information for which the effective time has expired. FIG. 19 is a flowchart showing the processing performed by the server 12 (FIG. 1 or 2) to erase time-space information for which the effective time has expired.

As is shown in FIG. 19, at step S301, the time-space DB 164 of the server program 14 (FIG. 3) operated by the server 12 is activated by the OS 140 periodically (e.g., every minute), and the current time is obtained from the OS 140.

At step S302, one time-space information item to be erased is extracted from the time-space information table in FIG. 7 that is stored and managed in the time-space DB 164.

At step S303, the time-space DB 164 extracts the effective time in the time-space information to be erased.

At step S304, the time-space DB 164 compares the current time obtained at step S301 with the extracted effective time. When the current time corresponds to the effective time, or the effective time has expired, program control moves to step S305. If the current time has not yet reached the effective time, program control goes to step S306.

At step S305, the time-space DB 164 erases the time-space information for which it is ascertained at step S304 that the effective time has expired.

At step S306, the time-space DB 164 determines whether all the time-space information has been processed. When all the information has been processed, the processing is thereafter terminated. In the other case, program control returns to step S302.

Time-Space Information Erasing by Mobile Station 22

Figure 20:
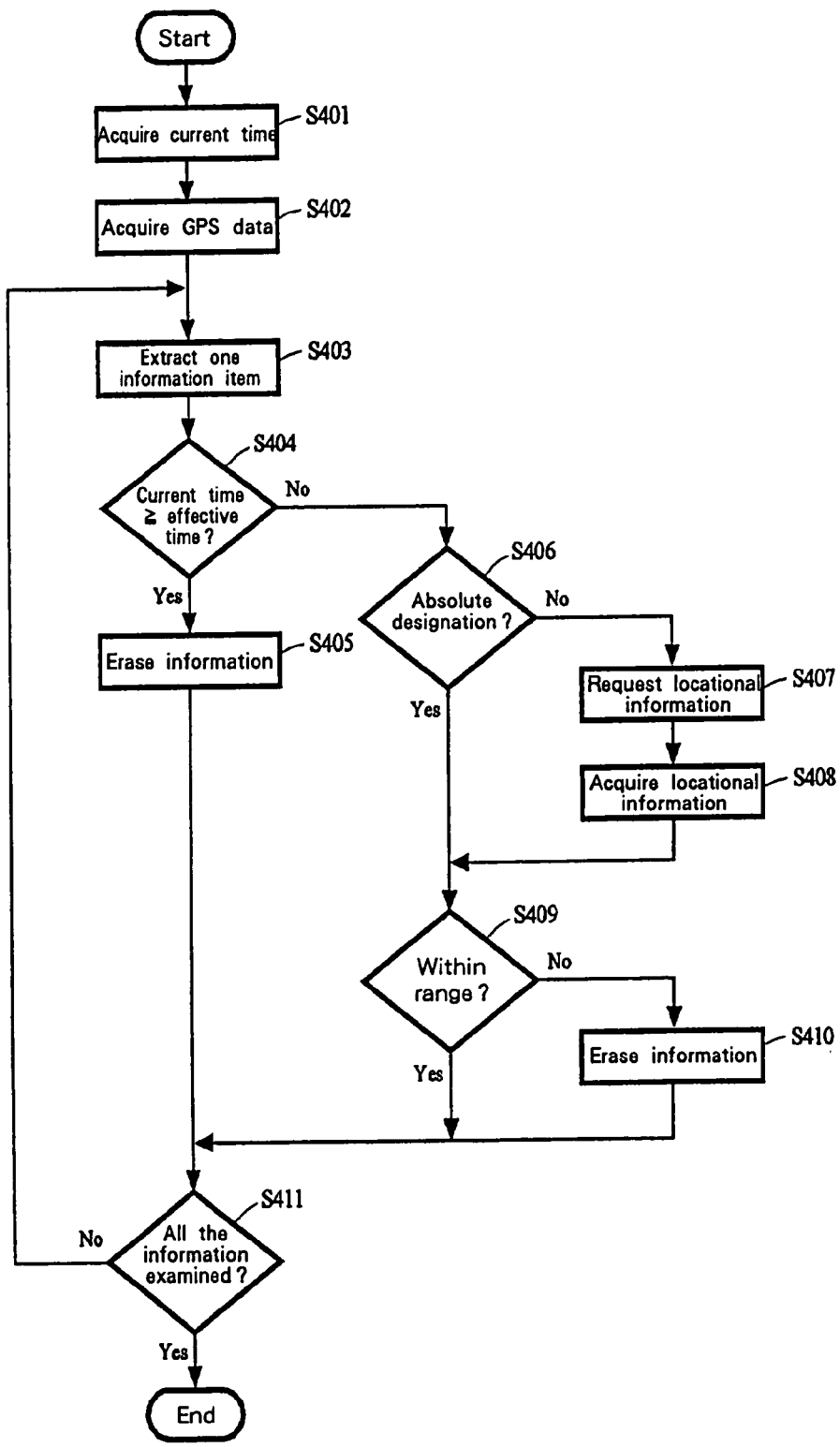
FIG. 20 is a flowchart showing the processing performed by the mobile station (FIG. 1 or 9) to erase time-space information of which the effective time has expired.
Figure 21:
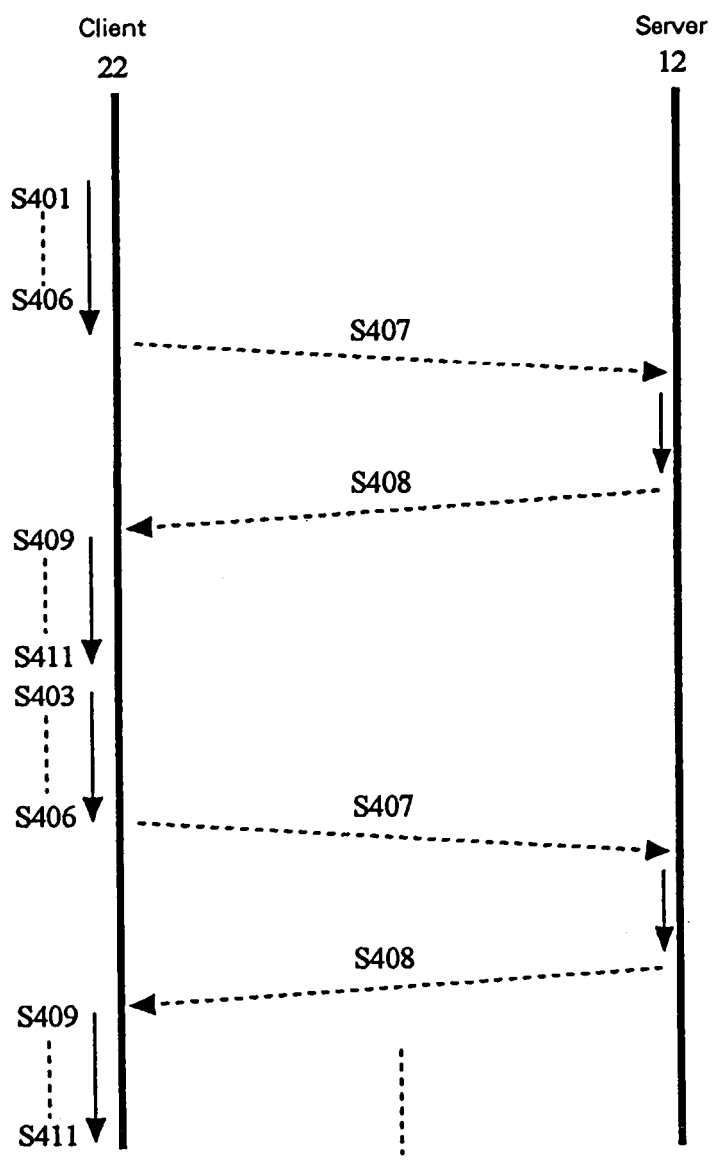
FIG. 21 is a sequence diagram showing the processing performed by the mobile station (FIG. 1 or 9) to erase time-space information of which the effective time has expired.

An explanation will now be given while referring to FIGS. 20 and 21 for the processing performed by the mobile station 22 (FIG. 1 or 9) to erase time-space information of which the effective time has expired. FIG. 20 is a flowchart showing the processing performed by the mobile station 22 (FIG. 1 or 9) to erase time-space information of which the effective time has expired. FIG. 21 is a sequence diagram showing the processing performed by the mobile station 22 (FIG. 1 or 9) to erase time-space information of which the effective time is past.

As is shown in FIGS. 20 and 21, at step S401, the DB 260 of the client program 24 (FIG. 10) operated by the mobile station 22 is activated by the OS 240 periodically (e.g., every one minute), and the current time is obtained from the OS 240.

At step S402, the DB 260 requests from the locational information processor 250 GPS data of the current location (latitude and longitude) of the mobile station 22. In response, the locational information processor 250 obtains, from the GPS controller 254, the GPS data, which it then outputs to the DB 260.

At step S403, the DB 260 extracts time-space information to be erased.

At step S404, the DB 260 acquires the current time from the OS 240, and compares it with the effective time in the time-space information to be erased in order to determine whether the effective time has expired. When the effective time has expired, program control moves to step S405. In the other case, program control advances to step S406.

At step S405, the DB 260 erases the target time-space information.

At step S406, the DB 260 determines whether a value of 1 (the designation of an absolute location range) has been entered for the effective range designation method included in the time-space information to be erased. When for the method the designation of an absolute locational range is indicated, program control moves to step S409. In the other case (the designation of a relative locational range), program control goes to step S407.

At step S407, the DB 260 transmits, to the server 12, short mail requesting the current locational information (latitude and longitude) of the mobile station 22 used to designate the absolute locational range.

At step S408, when the server 12 (FIG. 1 or 2) receives the short mail requesting the locational information, the search unit 152 of the server program 14 (FIG. 3) performs a search of the locational information table in the location DB 160. Then, the search unit 152 transmits, to the requesting mobile station 22, short mail including the locational information (latitude and longitude) of the mobile station 22 that serves as the center of the relative locational range.

When the mobile station 22 receives from the server 12 the short mail including the locational information (latitude and longitude), the DB 260 obtains the locational information included in the received short mail.

At step S409, the DB 260 determines whether latitude and longitude indicated by the GPS data obtained at step S402 fall within the effective range included in the time-space information to be erased. If the latitude and longitude fall within the range, program control goes to step S411. If the latitude and the longitude are outside the range, program control advances to step S410.

At step S410, the DB 260 erases the target time-space information.

At step S411, the DB 260 determines whether all the information has been examined. If all the information has been examined, the processing is thereafter terminated. When all the information has not yet been examined, program control returns to step S403.

Modification

The Internet 100 (FIG. 1) and the portable telephone system 2 need not be separate entities, and may be joined together. The time-space information in FIG. 7 may be directly transmitted to the server 12, rather than being transmitted via the mobile station 22. Also, the personal information (FIG. 6) may be directly transmitted to the server 12, rather than being transmitted via the mobile station 22. And further, to determine the effective time, for the time zone in the time-space information table in FIG. 7 both the start time and the end time may be set; or the year may also be set; or the start time and an effective time length may be set.

Effects

As is described above, in the thus arranged communication system 1, regardless of the size of the communication area established for a base station 202, time-space information can be broadcast to individual mobile stations 22 that are present within an absolute locational range that has been designated, such as a range for which station A is the center and that has, for example, a radius of 200 meters. Since the relative effective range can also be designated for the communication system 1, the effective range can be dynamically changed, and information can be broadcast, even when the user of the mobile station 22 is in a moving car. In addition, since the number of the mobile stations 22 is limited, as distribution destinations and the distribution of information is designated depending on an attribute of a user, the flexible and precise distribution of information to users can be performed.

Communication System 3

Figure 23:
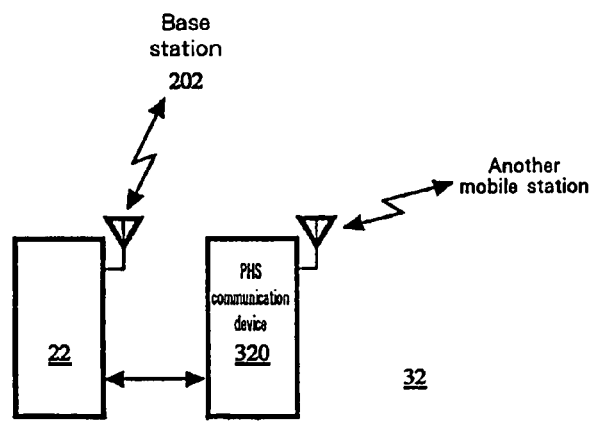
FIG. 23 is a diagram showing the arrangement of a portable telephone/PHS mobile station in FIG. 22.
Figure 24:
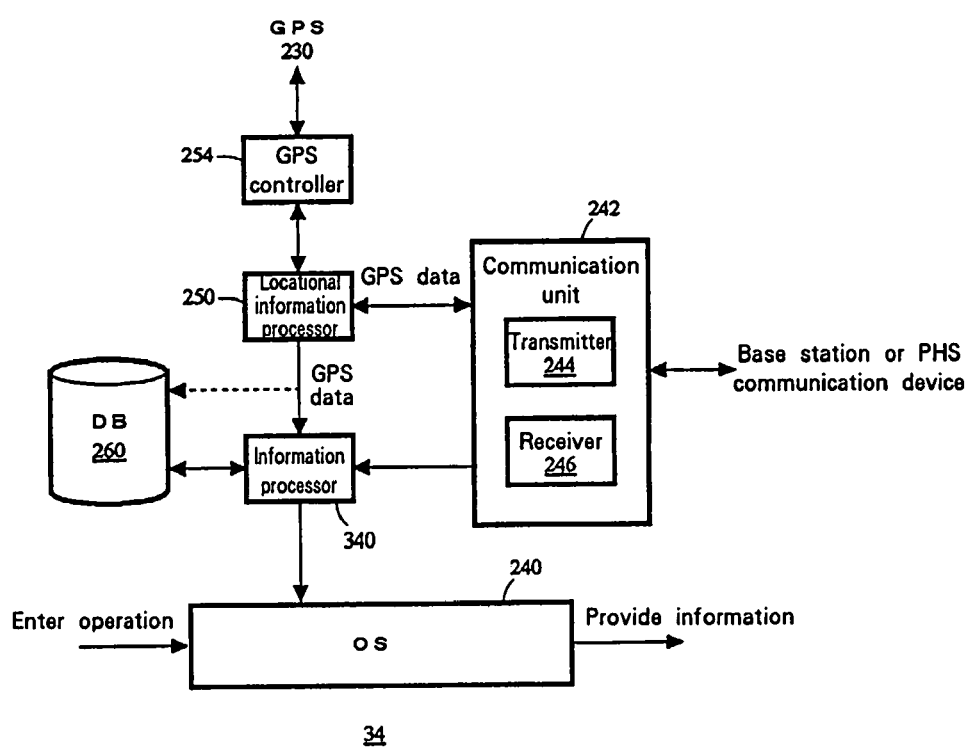
FIG. 24 is a diagram showing a connection relationship when the mobile stations in FIG. 22 communicate with each other via a base station.
Figure 25:
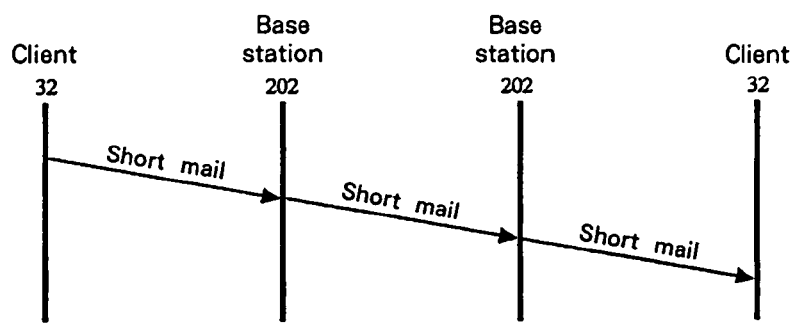
FIG. 25 is a diagram showing a connection relationship when the mobile stations in FIG. 22 communicate with each other directly.

FIG. 22 is a diagram illustrating an example arrangement of a communication system 3 for which a mobile communication method according to the second embodiment of the present invention is applied. FIG. 23 is a diagram showing the arrangement of a portable telephone/PHS mobile station 32 shown in FIG. 22. FIG. 24 is a diagram showing a connection relationship when the portable telephone/PHS mobile stations 32 in FIG. 22 communicate with each other via the base station 202. FIG. 25 is a diagram showing a connection relationship when the portable telephone/PHS mobile stations 32 in FIG. 22 communicate directly with each other.

As is shown in FIG. 22, the communication system 3 comprises the server 12, the Internet 100, the gateway 102 and the portable telephone system 2, all of which are shown in FIG. 1, and the portable telephone/PHS mobile stations 32-1 to 32-n (one of which will, hereinafter, be referred to simply as a mobile station 32 when a particular mobile station is not specified).

As is shown in FIG. 23, in accordance with the arrangement used for a mobile station 32, a PHS communication device 320 is added to a mobile station 22 shown in FIG. 9. As is shown in FIGS. 22 and 24, the mobile station 32 uses a phone function having a communication distance of several kilometers for engaging in oral communications with another mobile station 32, or for the exchange of short mail via the base station 202 and the server program 14. Also, as is shown in FIGS. 22 and 25, the mobile stations 32 can communicate with each other directly, without the base station 202 being required.

Figure 26:
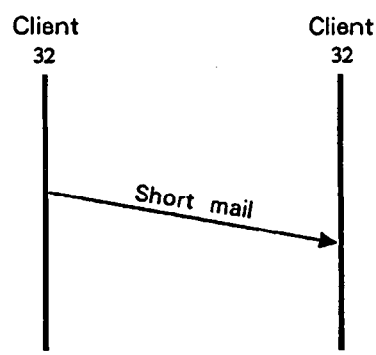
FIG. 26 is a diagram showing the structure of a client program executed by the mobile station shown in FIG. 22 or 23.

FIG. 26 is a diagram showing the arrangement of a client program 34 executed by the mobile station 32 shown in FIG. 22 or 23. As is shown in FIG. 26, in accordance with the arrangement used for the client program 34, an information processor 340 is added to the client program 24 (FIG. 10).

The client program 34, as well as the client program 24 in the first embodiment, interacts with the server 12 for the distribution of short mail, and also transmits to another client program 34 short mail in which is designated an effective range, etc. As in the first embodiment, the client program 34, which is recorded on, for example, a recording medium 120, is supplied to the mobile station 32, is loaded into the flash memory 222 of the mobile station 32, and is executed.

Information Processor 340

Based on the time and GPS data (the location (latitude and longitude) of the mobile station 32), the information processor 340 processes time-space information received from another mobile station 32. When the location of the mobile station 32 and the time fall within a designated range, the information included in the received time-space information is displayed on the display/input device 226 of the mobile station 32.

Time-Space Transmission Processing

Figure 27:
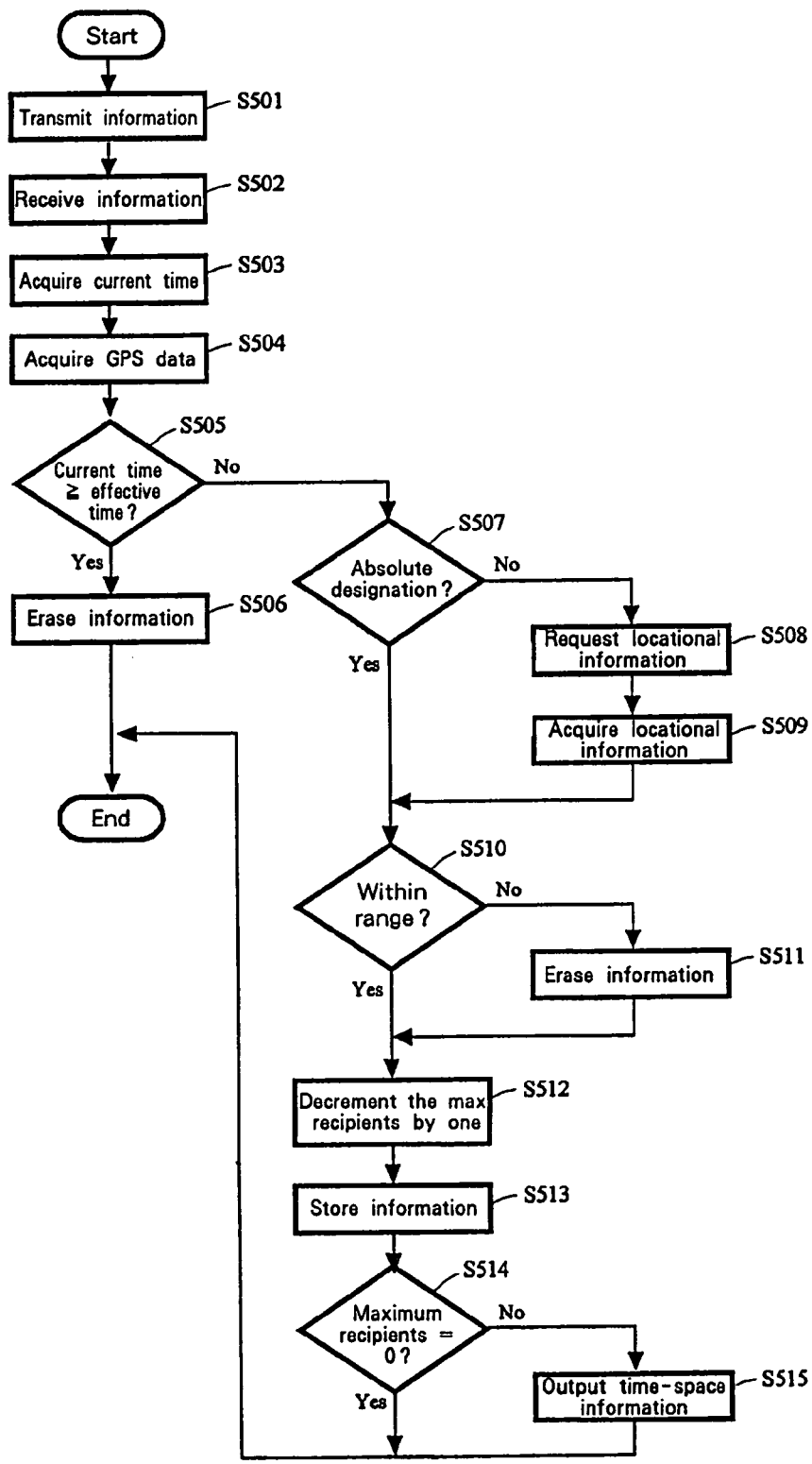
FIG. 27 is a flowchart showing the time-space information transmission processing performed by the communication system (FIG. 22).
Figure 28:
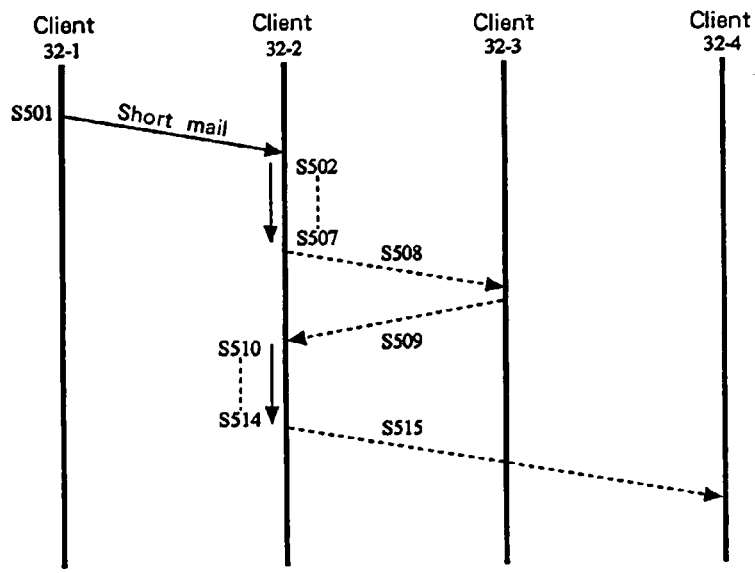
FIG. 28 is a sequence diagram showing the time-space information transmission processing performed by the communication system (FIG. 22).

An explanation for the time-space information transmission processing performed by the communication system 3 will now be given while referring to FIGS. 27 and 28. FIG. 27 is a flowchart showing the time-space information transmission processing for the communication system 3 (FIG. 22). FIG. 28 is a sequence diagram showing the time-space information transmission processing for the communication system 3 (FIG. 22).

As is shown in FIGS. 27 and 28, at step S501 the transmitter 144 of the client program 34 (FIG. 26) of a specific mobile station 32 (e.g., a mobile station 32-1) transmits, to another mobile station 32 (e.g., a mobile station 32-2), short mail including time-space information that contains information to be transmitted to the mobile station 32-2.

At step S502, the receiver 246 of the client program 34 of the mobile station 32-2 receives the short mail from the mobile station 32-1, and extracts the time-space information and transmits it to the information processor 340.

At step S503, the information processor 340 of the mobile station 32-2 obtains the current time from the OS 240.

At step S504, the information processor 340 of the mobile station 32-2 requests from the locational information processor 250 GPS data of the current location (latitude and longitude) of the mobile station 32. Upon receiving the request, the locational information processor 250 transmits the GPS data to the information processor 340.

At step S505, the information processor 340 of the mobile station 32-2 compares the effective time included in the received time-space information with the current time. When the effective time has expired, program control goes to step S506. When the current time does not yet reached the effective time, program control moves to step S507.

At step S506, the information processor 340 of the mobile station 32-2 erases the received time-space information.

At step S507, the information processor 340 of the mobile station 32-2 determines whether the value entered for the effective range designation method included in the received time-space information is 1 (the designation of an absolute effective range). If the designation of the absolute effective range is set, program control goes to step S510. In the other case, program control moves to step S508.

At step S508, the information processor 340 of the mobile station 32-2 transmits short mail requesting GPS data to the mobile station 32 (e.g., a mobile station 32-3) that is designated as the center of the effective range.

Upon receiving the request, the client program 34 of the mobile station 32-3 transmits to the mobile station 32-2 short mail in which it includes GPS data for its location (latitude and longitude).

At step S509, the receiver 146 of the mobile station 32-2 receives the short mail from the mobile station 32-3, and outputs the GPS data included in the short mail to the information processor 340.

In this fashion, the information processor 340 obtains the GPS data.

At step S510, the information processor 340 of the mobile station 32-3 determines whether the location of the mobile station 32-2 falls within the effective range of the time-space information included in the received short mail. If the mobile station 32-2 is outside the effective range, program control goes to step S512. If the mobile station 32-2 is within the effective range, program control advances to step S511.

At step S511, the information processor 340 erases the received time-space information.

At step S512, the information processor 340 decrements, by one, the maximum number of recipients of the received time-space information, and outputs the resultant number to the DB 260. At step S513, the DB 260 stores and manages the time-space information received from the information processor 340.

At step S514, the information processor 340 determines whether the resultant maximum number of recipients is 0. When the number is 0, the processing is thereafter terminated. But if the number is not 0, program control goes to step S515.

At step S515, the information processor 340 outputs the time-space information to the transmitter 244. The transmitter 244 then transmits, to another mobile station 32 (e.g., a mobile station 32-4) short mail including the received time-space information.

Erasing Time-Space Information

The client program 34 (FIG. 26) performs the same processing as that performed by the client program 24 in FIGS. 20 and 21 to erase time-space information of which the effective time has expired.

Figure 29:
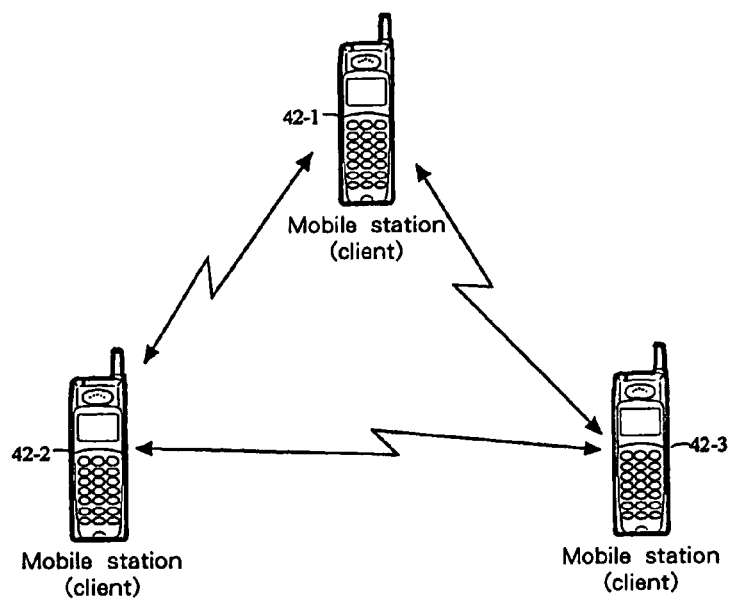
FIG. 29 is a diagram showing a modification of the communication system in FIG. 22.

FIG. 29 is a diagram showing a modification of the communication system 3 in FIG. 22. A plurality of PHS mobile stations 42 (42-1 to 42-3) may be used for which the communication device 228 has been removed from the client program 34 in the second embodiment. In this modification, only direct communication between the PHS mobile stations 42 is performed, no communication is performed via the base station 202, and information is distributed by designating a locational range.

As is described above, according to the mobile communication system and the method therefor of the present invention, a communication partner can be selected by designating a specific location.

Further, according to the mobile communication system and the method therefor of the present invention, a communication partner can be selected by designating a specific location, and also designating a time zone and an attribute.

While specific embodiments of the present invention have been described, a number of modifications and additions can be made to those embodiments. Therefore, it should be understood that the present invention is not limited to these embodiments, but includes embodiments covered by the spirit and scope of the appended claims.

We claim:

1. A mobile communication system, for broadcasting a message to not more than a specified number of mobile stations out of a plurality of mobile stations located within a designated communication area, comprising:
   location receipt and storage means for receipt and storage of the locations of said plurality mobile stations transmitted to the receipt and storage means by the mobile stations over a communications network and the internet;
   personal information database means for personal information about each mobile station user's interests and/or personal tastes;
   designation accepting means for accepting the designation of said communication area based on the stored locations;
   mobile station selection means for selecting the specified number mobile stations to be called out of the plurality of mobile stations based on said accepted communication areas the stored locations of said mobile stations and the personal information contained in the personal information database means; and
   calling means, for broadcasting the message to said selected mobile stations to be called while keeping a count of the number of the mobile stations already called to assure the assigned specified number of mobile station recipients called is not exceeded.

2. The mobile communication system according to claim 1, wherein, said designation accepting means accepts the designation of a time zone; and
   a limit on the effective time within the time zone for each user.

3. The mobile communication system according to claim 1, wherein each of said plurality mobile stations includes:
   a GPS location detection means in each of the mobile stations to detect the location of the mobile station containing the location detection means; and
   location notification means for notifying said calling device of the detected location of said mobile station.

4. The mobile station system of claim 1 including:
   a server on the internet containing messages in an internet mail form format, the server having a server database containing the location receipt and storage means and the personal information database means with data correlated with phone numbers of the mobile station;
   a portable telephone system including a plurality of base stations with at least one of the base stations covering the designated communication area and other base stations covering other designated communication areas, and the mobile stations which may be in one or more of the designated areas with the base stations providing data in a short form format to the mobile stations each identified by a telephone number; and
   a gateway for converting between data in short form and internet mail form.

5. The mobile station system of claim 4, wherein the internet address of each user includes the phone number of the user's mobile station.

6. The mobile communication system of claim 5, wherein the information in the database correlated to each user's mobile station number includes:
   the user's phone number or name;
   a message ID which is used by the mobile station to manage received time-space information;
   a category reflecting the user's personal interests used to determine a reduced number of distribution destinations of transmission information when the number of mobile stations present in the effective range exceeds a maximum number of recipients;
   an effective time which provides the date on which transmission information becomes invalid;
   an effective range designation method for designating the locational range of a mail distribution destination for the mobile station when 1 is entered for the effective range designation method an absolute effective range designation is used; when 2 is entered, it means a relative effective range designation is used;
   an effective range numerical value that specifically limits the locational range of the mail distribution destination; when 1 is entered for the effective range designation method the is a set of numerical values comprising the latitude and the longitude at the center of the locational range of a mail distribution destination and the radius of the range; when 2 is entered for the designation method a pair of two numerical values comprising the user name of a mobile station located at the center of the locational range of a mail distribution destination and the radius of the range;

a maximum number of recipients lists the maximum number of mobile stations to which information is to be transmitted when the number of destinations is limited, when 0 is entered for the maximum number of recipients, the number of mobile stations that may receive information is not limited; and contents of information to be displayed on a display/input device of the mobile station that is a distribution destination.

7. A mobile communication system for providing information concerning one or more mobile stations located within a designated communication area, each of said mobile stations comprising:

designation accepting means, for at the least accepting the designation of said communication area;

information transmission means, for transmitting from one mobile to another mobile station information including the one mobile stations phone number designation of said accepted communication area, the areas radius centered at the one mobile station and location data from a GPS system in the one mobile station;

information receiving means at the another mobile station, for receiving said transmitted information;

a GPS location detection means in the another mobile station, for detecting the location of the another mobile station; and information provision means, for providing information between the one and another mobile stations when the detected location of said another mobile station is within said communication area included in said received information.

8. A mobile communication method, for sending a message to no more than a specified number of mobile stations out of a greater plurality of mobile stations located within a designated communication area, said method comprising the steps of:

generating with a GPS in each of the plurality mobile stations the latitude and longitude location of the mobile station containing GPS location detection means;

receiving at an internet server from each of the plurality of mobile stations their latitude and longitude locations over a communications network;

storing the locations of said plurality mobile stations along with personal information about each of the mobile station users personal interests and/or preferences in the internet server;

accepting the designation of said communication area;

selecting from the plurality mobile stations the specified number of mobile stations to be called based on said accepted communication area, the stored locations of said mobile stations, and the personal information of the users of the mobile stations; and calling said selected mobile stations to be called sequentially keeping count of the number called so that the number of mobile stations called does not exceed the specified number.

9. The method of claim 8 including the steps of:

receiving mail from a mobile phone and storing of any location information included in the mail in a database of the server;

using the search unit of the server to examine an effective range designation for the information included in the received mail;

storing the location information in the database at a location identified by a mobile phone number for the mobile telephone number;

searching the database to acquire the user names of all the mobile stations present within an area described by a radius originating at a center of the designated communication area;

determining whether the number of mobile stations located in the effective range is greater than the specified number of message recipients;

searching a personal information table in the server to obtain user names for mobile stations for which personal information matches a selected category of personal information to reduce the number of mobile stations to be equal or smaller than the maximum number of recipients;

outputting from the server the message to the mobile stations selected as destinations not exceeding the specified number.

10. The method of claim 8 including the steps of:

periodically requesting the GPS controller in a particular mobile station to determine the location of the particular mobile station;

having the GPS controller generate GPS data of the location (latitude and longitude) of the mobile station;

transmitting the obtained GPS data to the server including with the generated GPS data the personal information of the user;

using the GPS data or the personal information included in the transmitted information to update that information in the database of the server;

determining whether the mobile station has moved and whether its location is in the effective range determined by information in the server database, and when the location of the mobile station falls in the specific effective range of the designated communication area having the message transmitted to the pertinent mobile station;

having the server decrement by one the maximum number of recipients of the message yet to receive the message;

terminating processing when the mail has been transmitted to the specified number of recipients.

11. A mobile communication method for providing information concerning one or more mobile stations located within a designated communication area, the method of operation between said mobile stations comprising the steps of:

providing for two ranges of communication areas for mobile stations, one being an absolute effective range and the other a relative effective range;

using a GPS system in one mobile station to determine the location of the one mobile station when effective range is used for communication;

transmitting over a communications network from the one mobile station to another mobile station information including the designation of said accepted communication area, its radius centered at the one mobile station and the phone number of the one mobile station;

receiving said transmitted information at said another mobile station;

detecting at the another mobile station the location of said one mobile station from information provided by said one mobile station; and providing information from the another mobile station to the one mobile station when the GPS system of the another mobile station determines the detected location of said one mobile station is within said communication area included in said received information.

12. A recording medium for one mobile station of a mobile communication system that comprises a base station to be connected by radio to a plurality of mobile stations, and a calling device that includes location storage means, designation accepting means, mobile station selection means and calling means for calling other mobile station directly or via said base station, said recording medium storing a program to permit a computer to execute the steps of:
   detecting the location of the one mobile station containing the program at mobile station using a GPS location device in the one mobile station;
   notifying said calling device over a communications network of a relative effective range to transmit from the detected location of said one mobile station directly to another of said mobile stations; and
   providing to the another said mobile station the telephone number of the one mobile station, the location of the one mobile station and the radius of the relative effective range.

13. A computer program product on a recording medium for inclusion in mobile stations of a mobile communication system for providing information concerning one or more mobile stations located within a designated communication area, said recording medium including:
   software for accepting the designation of said communication area from a GPS system in one mobile station;
   software for transmitting from the one mobile station to the other mobile stations information including the designation of said accepted communication area which is centered at the location of the one mobile station;
   software for receiving said transmitted information;
   detecting the location of the one mobile station at other of mobile stations from information provided by the GPS device of the one mobile station; and
   providing information to the mobile communication system over a communication network in the system when the detected location at other mobile stations is within said communication area included in said received information.

14. The computer program product of claim 13 including software for providing information in a server database correlated to each user's mobile station number arranged as follows:
   the user's phone number or name;
   a message ID which is used by the mobile station to manage received time-space information;
   a category reflecting the user's personal interests used to determine a reduced number of distribution destinations of transmission information when the number of mobile stations present in the effective range exceeds a maximum number of recipients;
   an effective time which provides the date on which transmission information becomes invalid;
   an effective range designation method for designating the locational range of a mail distribution destination for the mobile station when 1 is entered for the effective range designation method an absolute effective range designation is used; when 2 is entered, it means a relative effective range designation is used;
   an effective range numerical value that specifically limits the locational range of the mail distribution destination; when 1 is entered for the effective range designation method the effective range is a set of numerical values comprising the latitude and the longitude at the center of the locational range of a mail distribution destination and the radius of the range; when 2 is entered for the designation method, a pair of two numerical values comprising the user name of a mobile station located at the center of the locational range of a mail distribution destination and the radius of the range;
   a maximum number of recipients lists the maximum number of mobile stations to which information is to be transmitted when the number of destinations is limited; when 0 is entered for the maximum number of recipients, the number of mobile stations that may receive information is not limited; and
   contents of information to be displayed on a display/input device of the mobile station that is a distribution destination.

15. The computer program product of claim 14 including:
   software to compare the current time with the effective time in the database information of a particular mobile station in order to determine whether the effective time has expired and when the effective time has expired, erasing the information;
   software to determine whether a value of 1 (the designation of an absolute location range) has been entered for the effective range designation method and when the absolute effective range has not been entered, requesting the phone number of the current location information (latitude and longitude) of the first mobile station used to designate the relative effective range;
   software to perform a search of the database for the locational information (latitude and longitude) of the one mobile station that serves as the center of the relative locational range; and
   software to determine whether latitude and longitude indicated by the GPS data of one or more of the other mobile stations fall within the effective range of the one mobile station.

* * * * *